(12) United States Patent
Doi

(10) Patent No.: US 11,310,551 B2
(45) Date of Patent: Apr. 19, 2022

(54) INFORMATION DEVICE, DEVICE CONTROL METHOD, DEVICE CONTROL SYSTEM AND DEVICE CONTROL PROGRAM

(71) Applicant: KABUSHIKI KAISHA TOSHIBA, Minato-ku (JP)

(72) Inventor: Takashi Doi, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 49 days.

(21) Appl. No.: 16/807,216

(22) Filed: Mar. 3, 2020

(65) Prior Publication Data
US 2021/0084253 A1    Mar. 18, 2021

(30) Foreign Application Priority Data

Sep. 13, 2019    (JP) .............................. JP2019-167622

(51) Int. Cl.
*H04N 21/422*    (2011.01)
*H04N 5/775*    (2006.01)
*H04N 21/426*    (2011.01)

(52) U.S. Cl.
CPC ..... *H04N 21/42204* (2013.01); *H04N 5/7755* (2013.01); *H04N 21/426* (2013.01)

(58) Field of Classification Search
CPC .......... H04N 21/42204; H04N 5/7755; H04N 21/426
USPC ............................. 348/734, 552, 553, 14.05
See application file for complete search history.

(56) References Cited

U.S. PATENT DOCUMENTS

2010/0008636 A1*  1/2010  Ohno ................... H04N 5/4401
                                                             386/215
2014/0184395 A1   7/2014  Doi et al.
2017/0244779 A1*  8/2017  Reichling ........ H04N 21/41407

FOREIGN PATENT DOCUMENTS

JP    2012-085152 A    4/2012
JP    2014-131249 A    7/2014
WO    WO 2010/032289 A1    3/2010

* cited by examiner

*Primary Examiner* — Samira Monshi
(74) *Attorney, Agent, or Firm* — Oblon, McClelland, Maier & Neustadt, L.L.P.

(57) ABSTRACT

According to one embodiment, an information device includes a request command transmission unit and an information reception unit. The request command transmission unit transmits, to an external device, a request command for obtaining information of one or more unique commands executable only by the external device from the external device. The information reception unit receives the information of one or more unique commands requested by the request command from the external device.

3 Claims, 17 Drawing Sheets

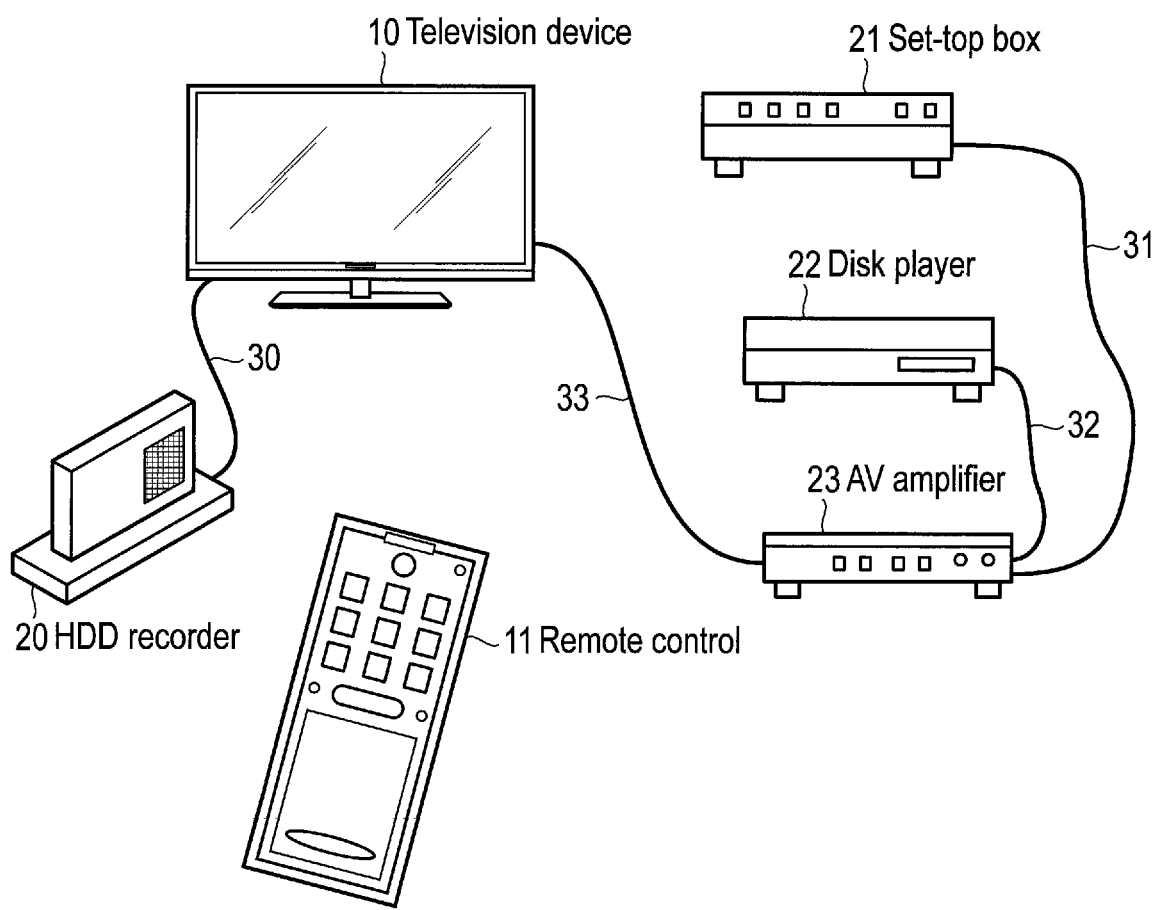
F I G. 1

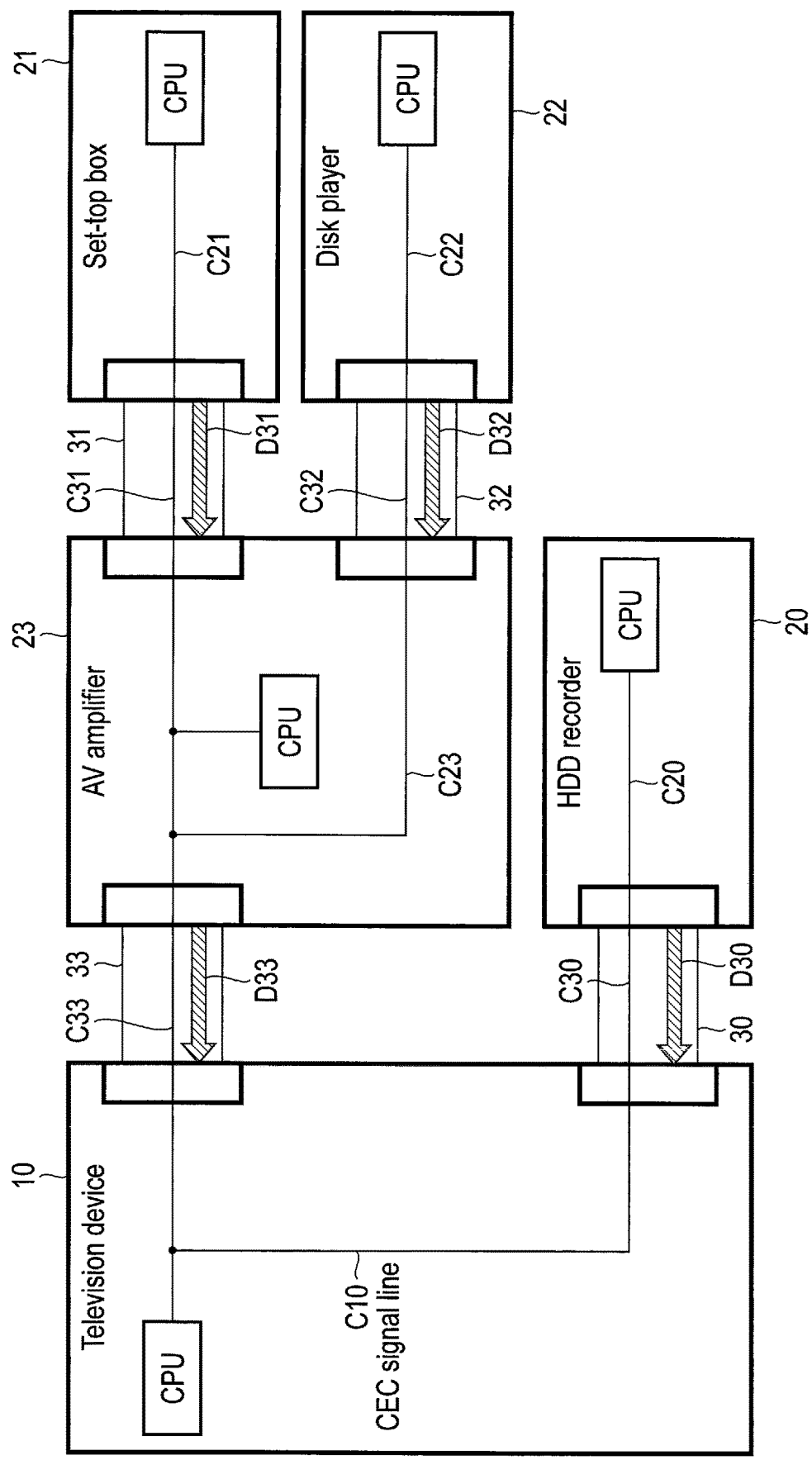
F I G. 2

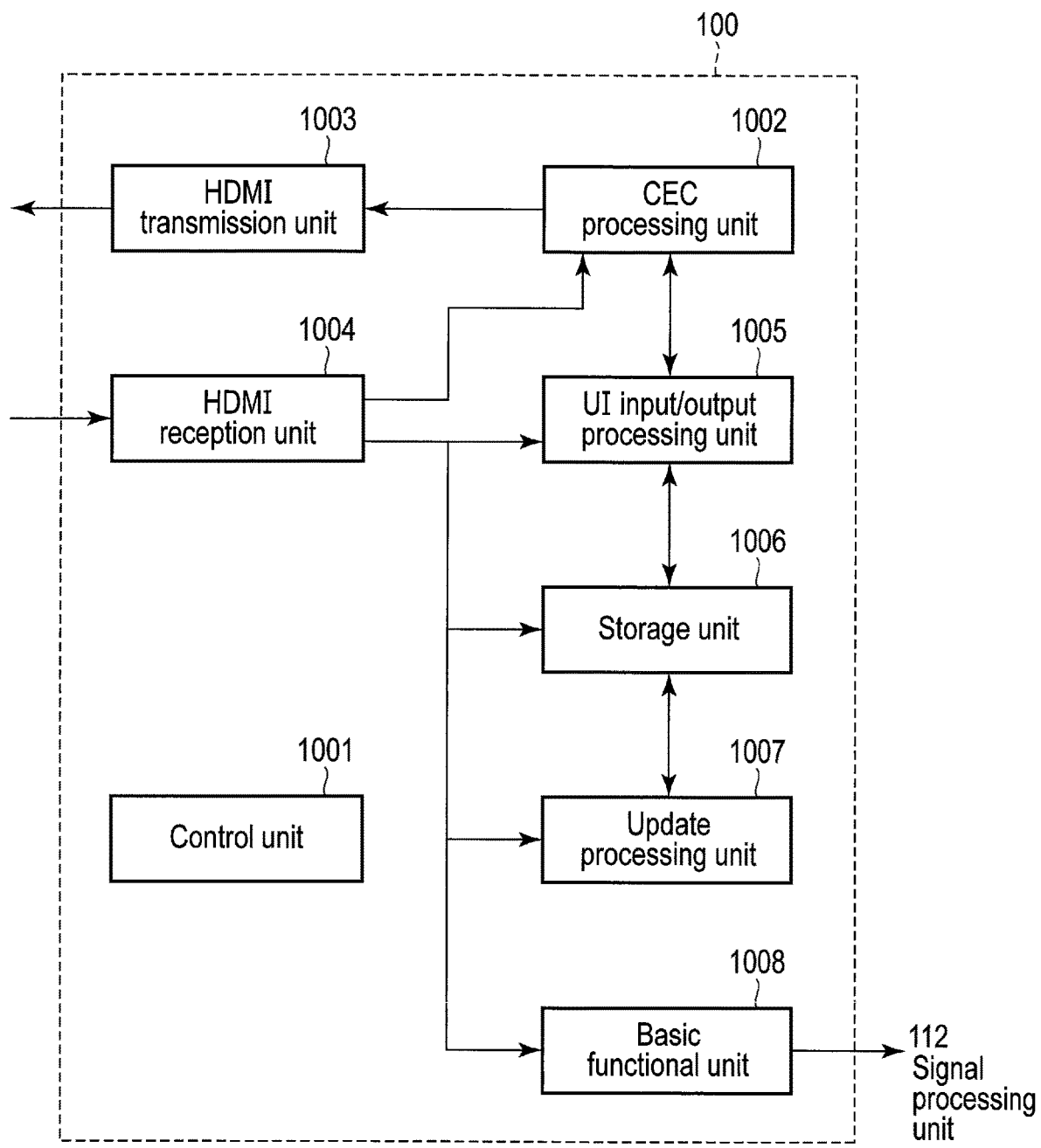
F I G. 4

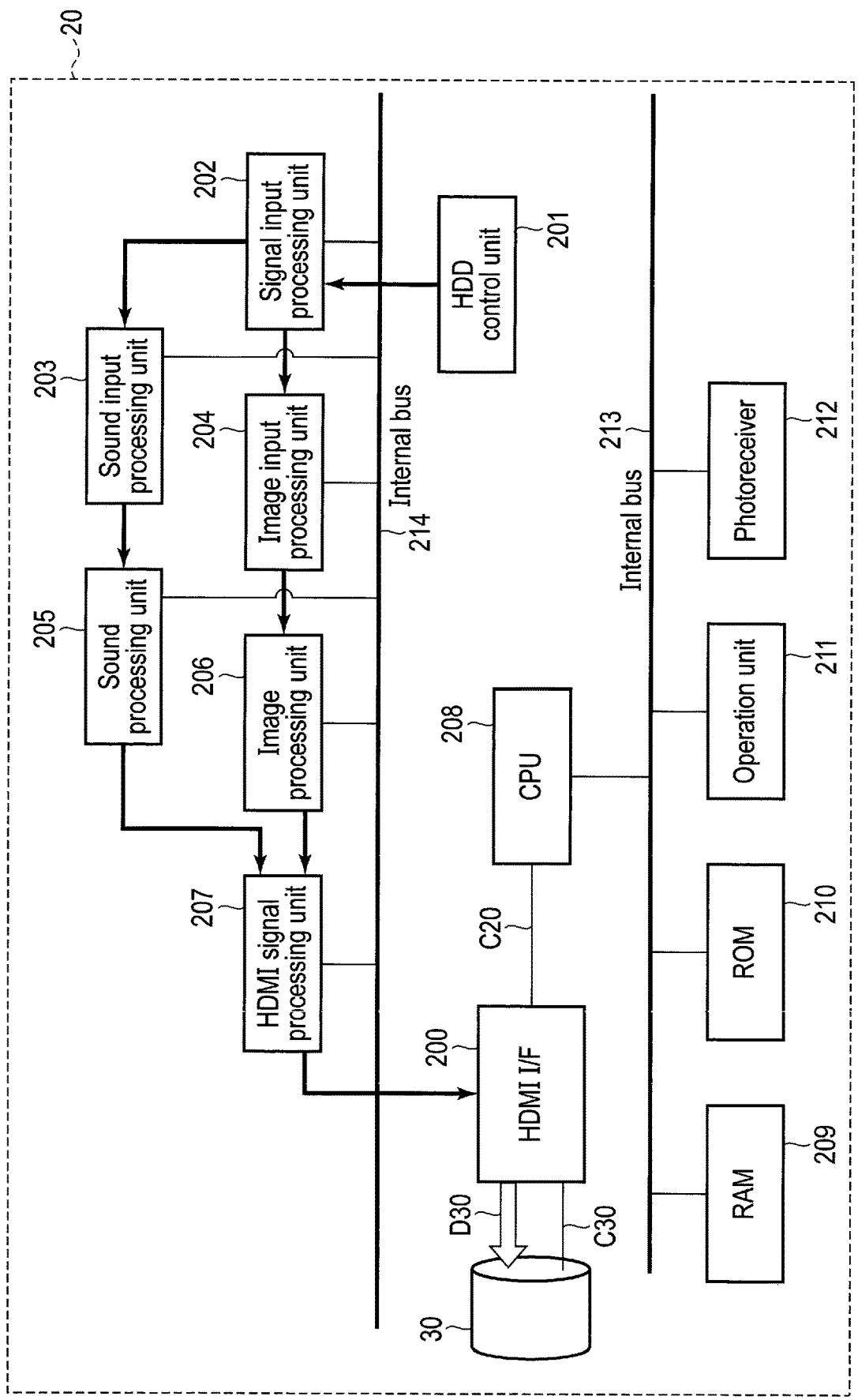
F I G. 5

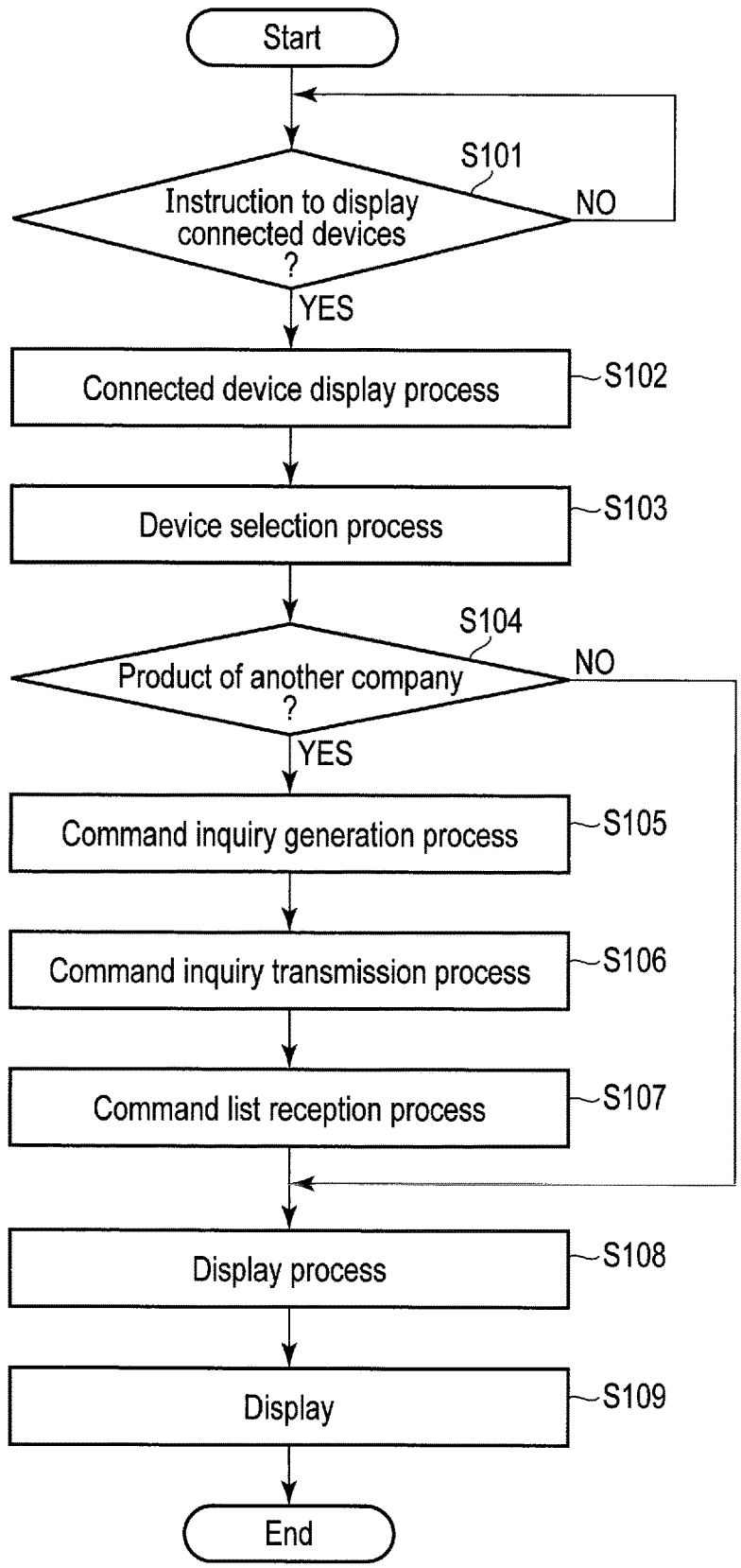
F I G. 8

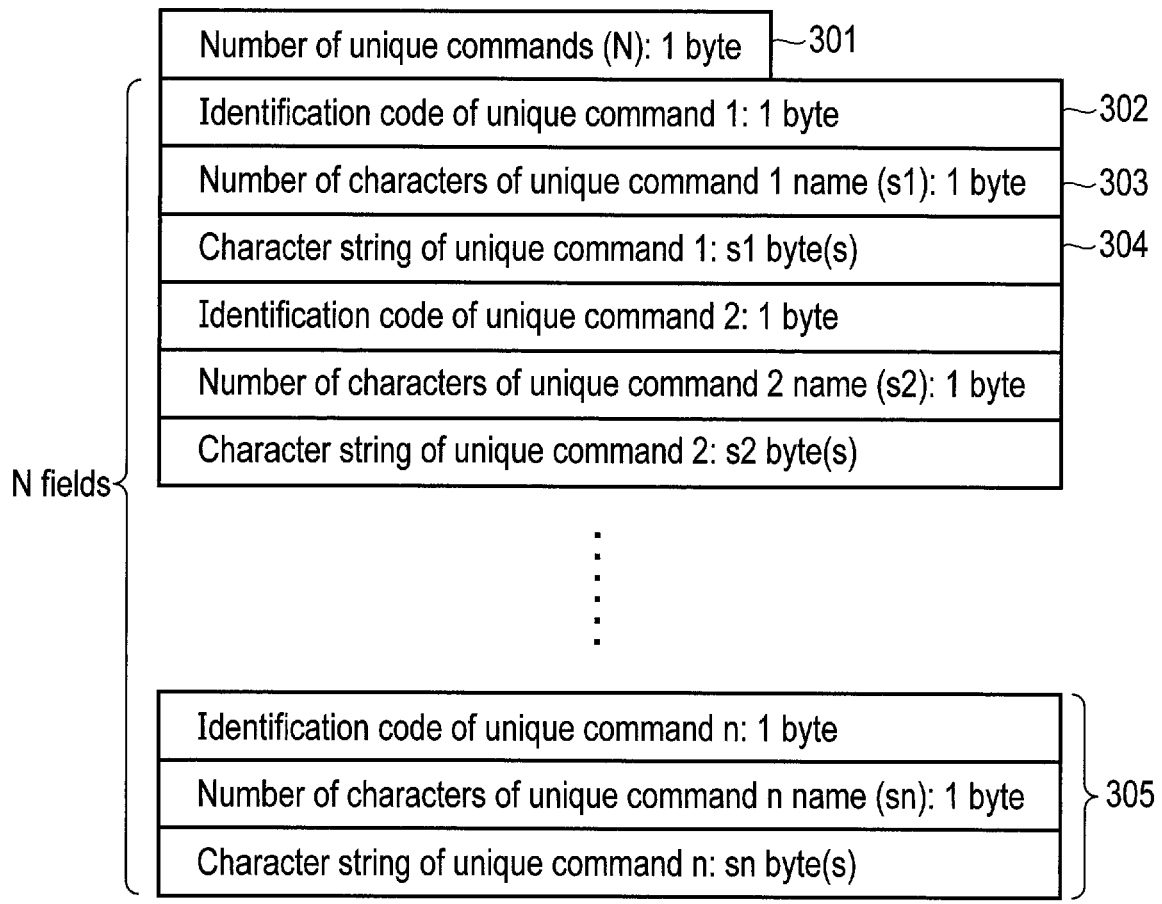
F I G. 10

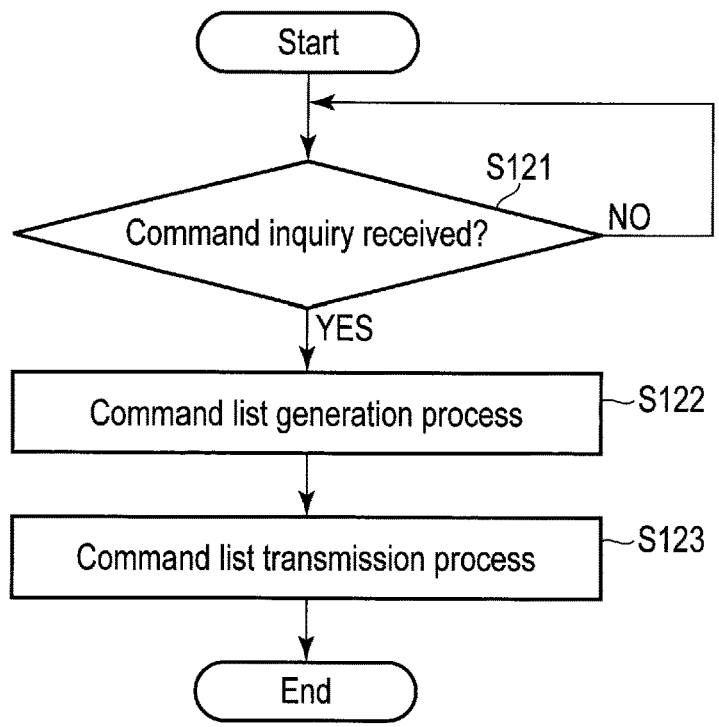
F I G. 12
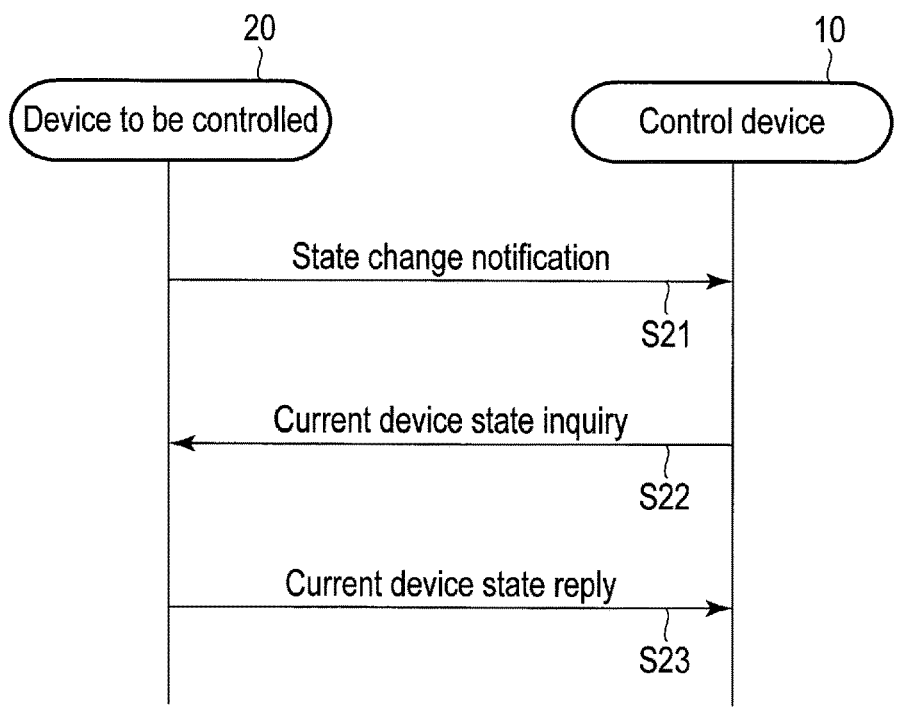
F I G. 13

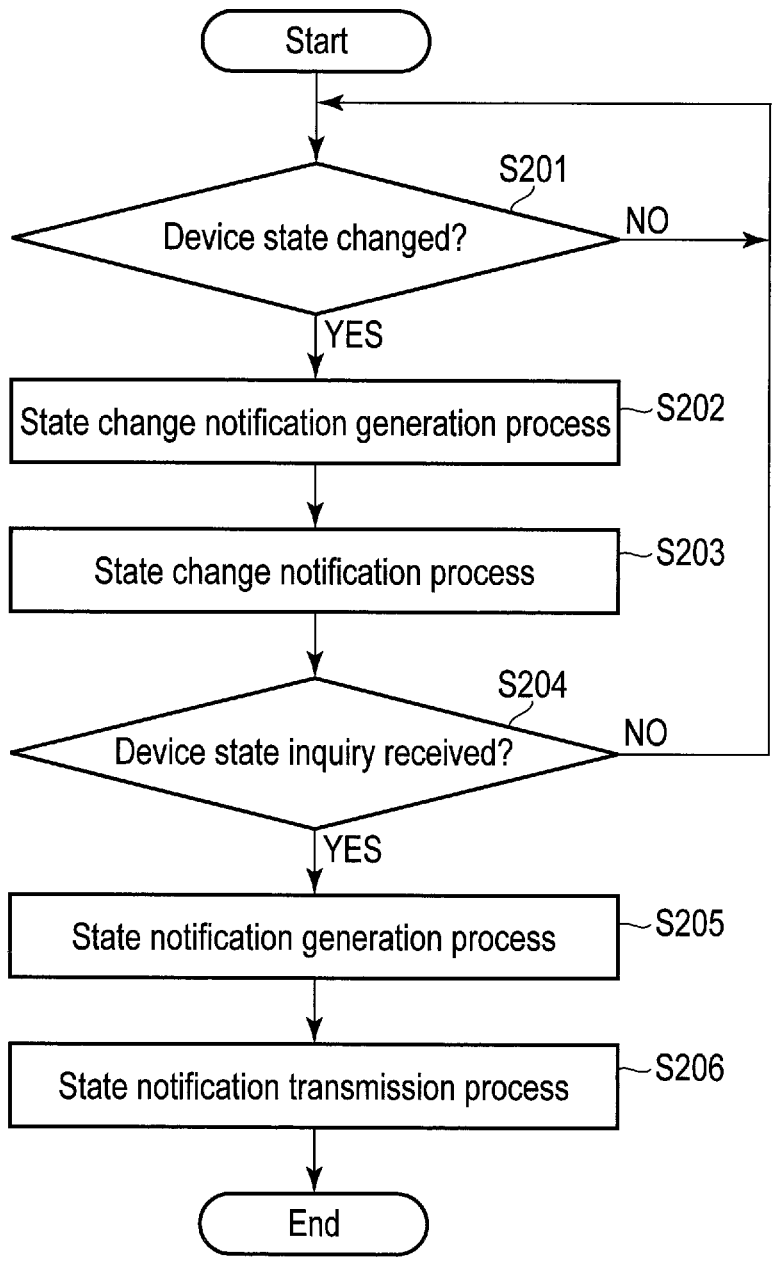
F I G. 14

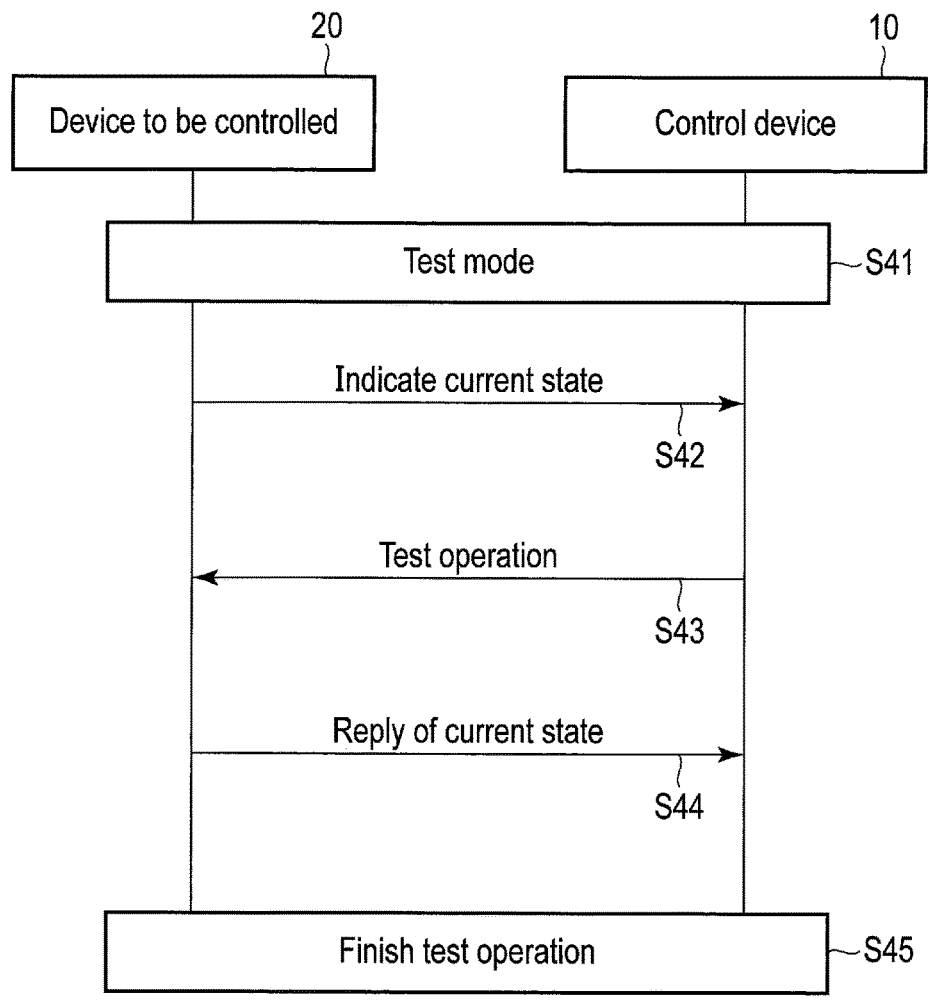
F I G. 19

INFORMATION DEVICE, DEVICE CONTROL METHOD, DEVICE CONTROL SYSTEM AND DEVICE CONTROL PROGRAM

CROSS-REFERENCE TO RELATED APPLICATIONS

This application is based upon and claims the benefit of priority from Japanese Patent Application No. 2019-167622, filed Sep. 13, 2019, the entire contents of which are incorporated herein by reference.

FIELD

Embodiments described herein relate generally to an information device, a device control method, a device control system and a device control program.

BACKGROUND

The High-Definition Multimedia Interface (registered trademark)-Consumer Electronics Control (HDMI-CEC) standard is a standard for realizing collaborative operations between devices in an HDMI system in which a plurality of devices are connected by HDMI interfaces.

In the HDMI-CEC standard, remote control pass through for realizing a common command which allows each device to control another device in the HDMI system and remote control between connected devices is defined.

However, in some cases, a device may define a command (hereinafter, referred to as a unique command) which cannot be controlled by a common command and is unique to the device. In particular, when devices of different vendors are present in the HDMI system (network), and a vendor defines a unique command, a function corresponding to the unique command cannot be performed from a device of another vendor. There is a demand for enabling the control of a device of another vendor with a unique command by a single remote control when the above remote control pass through function is used.

Embodiments described herein aim to provide an information device, a device control method, a device control system and a device control program such that, in an HDMI system in which a plurality of devices in conformity with the HDMI-CEC standard are connected to each other, each device is allowed to execute a unique command of another device.

BRIEF DESCRIPTION OF THE DRAWINGS

FIG. 1 is an explanatory diagram showing a connection example of devices of an HDMI system according to the present embodiment.

FIG. 2 shows the flow of data in the HDMI system according to the embodiment.

FIG. 4 is a block diagram showing an example of the functional configuration of the HDMI I/F of the television device according to the embodiment.

FIG. 5 is a block diagram showing an example of the functional configuration of an HDD recorder according to the embodiment.

FIG. 8 is a flowchart showing a processing operation in which the control device requests the information of unique commands from the device to be controlled according to the first embodiment.

FIG. 10 shows an example of a unique command list obtained by the control device according to the first embodiment.

FIG. 12 is a flowchart showing a processing operation in which the device to be controlled transmits a unique command list according to the first embodiment.

FIG. 13 is a sequence chart in which a notification regarding the device state of the device to be controlled is transmitted to a control device according to a second embodiment.

FIG. 14 is a flowchart showing a processing operation in which the device to be controlled transmits a notification of the device state to the control device according to the second embodiment.

FIG. 19 is a sequence chart in a test mode for allowing a unique command of the device to be controlled to be tested.

DETAILED DESCRIPTION

Figure 3:
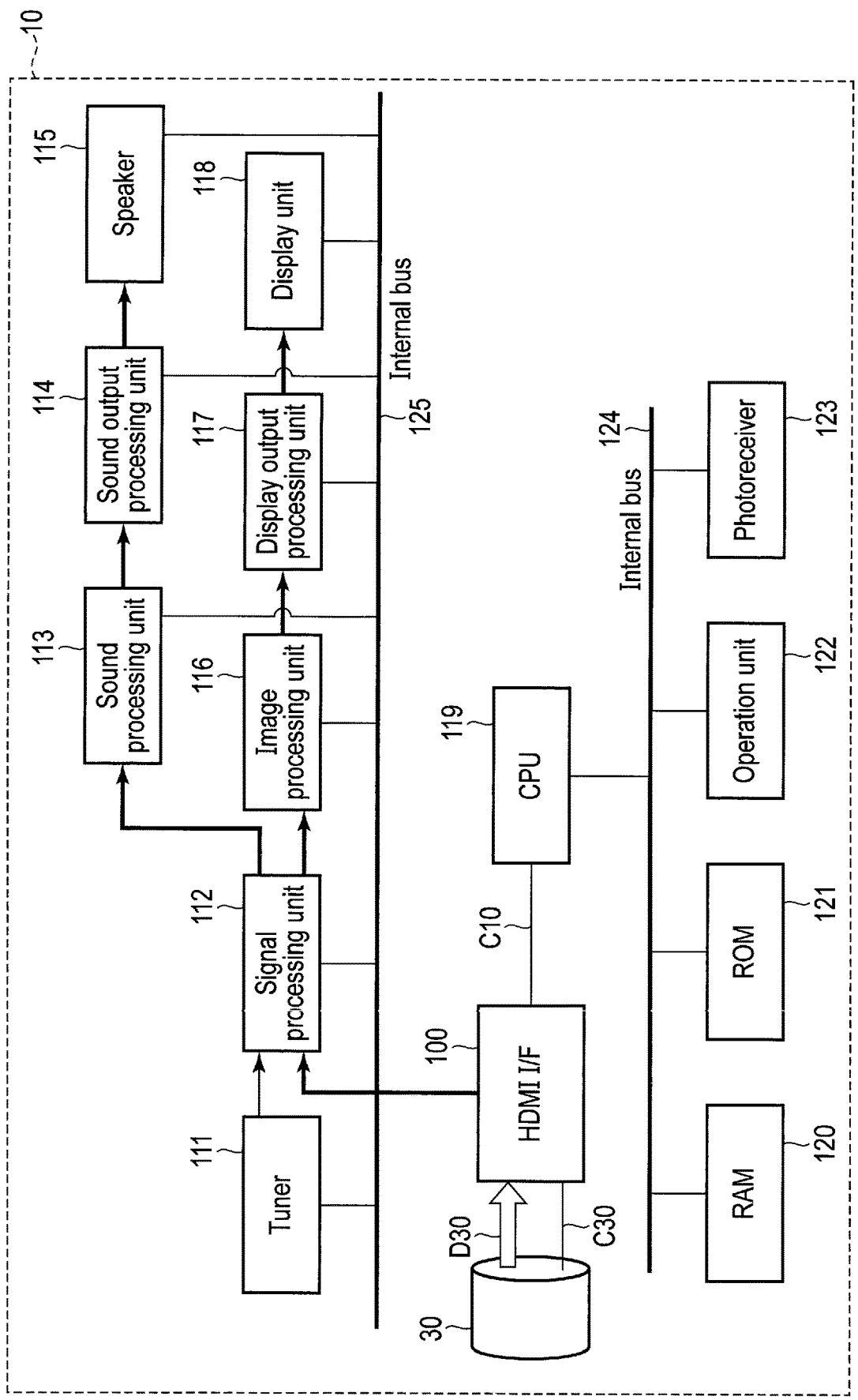
FIG. 3 is a block diagram showing an example of the functional configuration of a television device according to the embodiment.

Embodiments will be described hereinafter with reference to the accompanying drawings.

In general, according to one embodiment, an information device comprises a request command transmission unit and an information reception unit. The request command transmission unit transmits, to an external device, a request command for obtaining information of one or more unique commands executable only by the external device from the external device. The information reception unit receives the information of one or more unique commands requested by the request command from the external device.

FIG. 1 shows a connection example of devices in an HDMI system according to the present embodiment. A television device 10, an HDD recorder 20, a set-top box 21, a disk player 22 and an AV amplifier 23 are connected by HDMI cables 30, 31, 32 and 33.

In the HDMI system, each device is categorized as a source device which supplies image or sound data or a sink device which receives the image or sound data output from a source device and displays or outputs an image or sound. In the example of the present embodiment, the television device 10 is a sink device, and the HDD recorder 20 is a source device. However, the configuration is not particularly limited to this example.

The television device 10 is a television receiving device configured to receive digital broadcasting such as 2K broadcasting (high definition television) and 4K/8K broadcasting (Ultra-high-definition television). The television device 10 comprises one or more HDMI input ports. The television device 10 comprises an accompanying remote control 11. A user can remotely control the television device 10 by the remote control 11. The television device 10 is configured to select the image to be displayed from a plurality of HDMI input ports.

The content data of the digital broadcasting received by the television device 10 can be input to the HDD recorder 20 and can be stored in the HDD recorder 20. The HDD recorder 20 comprises an HDMI output port and is configured to output stored data to the outside. The HDD recorder 20 comprises unique commands such as "display a recorded program list" and "edit a recorded program list". Normally, these unique commands can be executed only by a switch provided in the HDD recorder 20 or an accompanying remote control (not the remote control 11) of the HDD recorder 20. However, in the example of the present embodiment, the commands can be executed from the remote control 11.

The set-top box 21 is connected to an antenna cable (not shown). The set-top box 21 comprises a tuner function configured to receive and process the broadcast signals of digital broadcasting received by an antenna, and is configured to store the content data obtained by a process such as demodulation and output the content data to another device configured to process it.

The disk player 22 is configured to play a disk such as a Blu-ray (registered trademark) disc and DVD, output data from an HDMI output port and cause the television device 10, etc., to display the data. The disk player 22 comprises unique commands such as "display an on-screen control menu", "switch resolution" and "select a sound stream". Normally, these unique commands can be executed only by a switch provided in the disk player 22 or an accompanying remote control (not the remote control 11) of the disk player 22. However, although an example is not shown in the embodiment, the commands can be executed from the remote control 11 by performing a process in a manner similar to that of the HDD recorder 20 of the present embodiment.

The AV amplifier 23 comprises an HDMI input port and an HDMI output port. For example, the AV amplifier 23 is configured to relay sound/image signals transmitted from the set-top box 21 or the disk player 22 to the television device 10. At this time, the AV amplifier 23 adjusts, for example, amplifies, sound data, and outputs image and sound data from the HDMI output port.

HDMI cables 30, 31, 32 and 33 and the devices connected by the HDMI cables are in conformity with the HDMI-CEC standard. Thus, in the present embodiment, remote control between the connected devices is enabled by the remote control pass through function of the HDMI-CEC standard. The remote control pass through function refers to CEA931C defining the remote control of devices.

For example, the HDD recorder 20, the set-top box 21, the disk player 22 and the AV amplifier 23 can be controlled from the accompanying remote control 11 of the television device 10. The television device 10 may comprise a program automatic recording function (including a timer recording function). In this case, the television device 10 is configured to cause the HDD recorder 20 to automatically record a program by the remote control pass through function. In addition to the recording function of the HDD recorder 20, for example, a playback function can be controlled. For example, the user causes the television device 10 to display a recorded program list stored in the HDD recorder 20, selects an arbitrary program to be played and determines it by the remote control 11. In this way, the user can play, display and view a recorded program stored in the HDD recorder 20.

When the user wants to view a program of a desired channel received in the set-top box 21, the user selects the desired channel by the remote control 11 with respect to the set-top box 21. The set-top box 21 receives the broadcast signal of the selected channel.

The received broadcast signal is transmitted to the television device 10 as a stream form in a state where the signal is demodulated and encoded (a state before decoding). At this time, a control signal and a stream are transmitted by HDMI cables 33 and 31.

Similarly, when the user activates the disk player 22 and plays a disk, the user operates the remote control 11 to cause the disk player 22 to play the disk. In this way, a reproduction signal (stream) reproduced in the disk payer 22 is transmitted to the television device 10 via the AV amplifier 23. At this time, a control signal and a stream are transmitted by HDMI cables 33 and 32.

The above television device 10 may be in conformity with an extended function (for example, HDMI2.x) of HDMI. The television device 10 may comprise both the information of a data block corresponding to HDMI2.x and the information of a data block corresponding to HDMI1.4b to transmit extended display identification data (EDID) as a reply to an image transmission request.

Now, this specification more specifically explains the function of HDMI-CEC.

FIG. 2 shows the flow of data in the HDMI system according to the embodiment.

In the HDMI system of the present embodiment, the television device 10 is set as a root, and the HDD recorder 20, the set-top box 21, the disk player 22 and the AV amplifier 23 are cascaded via HDMI cables 30, 31, 32 and 33. A CPU is incorporated into each device. These CPUs process the commands (hereinafter, referred to as CEC commands) of HDMI-CEC and control the function of each device in accordance with a command. In place of the CPUs, for example, a control function such as a microcontroller may be provided in each device for the HDMI system's exclusive use.

CEC control signal lines C10, C20, C21, C22 and C23 are the transmission channels of signals (hereinafter, referred to as CEC control signals) related to the CEC functions in the television device 10, the HDD recorder 20, the set-top box 21, the disk player 22 and the AV amplifier 23, respectively. CEC signal lines C30, C31, C32 and C33 are the transmission channels of signals (hereinafter, referred to as CEC signals) such as CEC commands by the CEC functions in HDMI cables 30, 31, 32 and 33, respectively. HDMI cables 30, 31, 32 and 33 comprise data signal lines D30, D31, D32 and D33. Here, the data signal lines indicate signal lines which are the transmission channels of signals other than CEC signals in the HDMI cable standard, and include control lines such as power lines and clocks as well as the transmission lines of data related to digital contents such as images and sound.

CEC signal lines C30, C31, C32 and C33 function as data buses between the devices connected via the HDMI cables. By using the CEC signal lines, regardless of whether the devices are sink devices or source devices, the devices are capable of exchanging signals such as CEC commands between them. Thus, each device is configured to control another device. Hereinafter, a device which controls another device is referred to as a control device, and the device controlled by the control device is referred to as the device to be controlled. Specifically, a control device generates a CEC command in conformity with the HDMI-CEC standard, and transmits the CEC command to the device to be controlled via a CEC signal line. The device to be controlled receives the CEC command, analyzes the CEC command, determines the contents, and operates in accordance with the CEC command by, for example, controlling the function of the device based on the determined contents. For example, the television device 10 receives a command (hereinafter, referred to as a remote control command) by a user's operation from the remote control 11, converts the received remote control command into a CEC command and transmits it to each device. The transmission channel of the CEC command transmitted from the television device 10 to each device is CEC signal line C30 in the case of the HDD recorder 20, and is CEC signal line C33 in the case of the AV amplifier 23. In the case of the set-top box 21 and the disk player 22, the AV amplifier is interposed. Thus, in the case of the set-top box 21, CEC signal lines C33 and C31 are the transmission channel of the CEC command. In the case of the disk player 22, CEC signal lines C33 and C32 are the transmission channel of the CEC command.

As described above, the HDMI-CEC standard allows the devices in the HDMI system to control each other by CEC commands. Even when the vendor of the device to be controlled is different from that of the control device, as common commands are defined in the HDMI-CEC standard, mutual control is enabled using common commands. However, the device to be controlled may comprise one or more unique commands which can be executed only by the device to be controlled itself such as its accompanying remote control and which is unique to the device to be controlled. In particular, when the vendor of the control device is different from that of the device to be controlled, the device to be controlled of the vendor comprises one or more unique commands, and the control device cannot control the device to be controlled by the unique command of the device to be controlled.

In the present embodiment, this specification shows an example in which the television device 10 (including the remote control 11) is a control device, and the HDD recorder 20 is the device to be controlled, and the vendor of the control device is different from that of the device to be controlled.

FIG. 3 is a block diagram showing an example of the functional configuration of the television device according to the embodiment.

The television device 10 is a receiving device (digital television) of digital broadcasting compatible with 2K, 4K/8K, etc.

An HDMI I/F 100 is the interface which connects HDMI cable 30 to the television device 10 in conformity with the HDMI-CEC standard, and exchanges data with an external device. In particular, the HDMI I/F 100 in the television device 10 which is a sink device receives and processes data received from an external device via data signal line D30 and related to contents such as images and sound, and outputs the data to, for example, a signal processing unit 112 such that contents such as images and sound can be viewed and heard from a speaker 115 and a display unit 118 through the subsequent process. The HDMI I/F 100 generates a CEC command based on, for example, a request from a CPU 119, and outputs the CEC command to CEC signal line C30. The HDMI I/F 100 of the present embodiment receives and processes a reply signal for the output CEC command. The reply signal includes, for example, a unique command list of the HDD recorder 20. For example, the HDMI I/F 100 processes the unique command list and outputs it to a display output processing unit 117 as display information. When the television device 10 is the device to be controlled, the HDMI I/F 100 receives and processes a CEC command from CEC signal line C30, and for example, transmits the CEC command to the CPU 119 via CEC control signal line C10.

A tuner 111 receives and processes a broadcast signal and outputs digital data. For example, the tuner 111 is configured to receive and process broadcast signals by digital broadcasting such as terrestrial digital broadcasting and satellite broadcasting.

The signal processing unit 112 processes digital data input from the tuner 111 and outputs various types of data streams. Specifically, the signal processing unit 112 performs processes such as descrambling by a conditional access system (not shown) and demultiplexing for separating data, and outputs a data stream to a subsequent function. For example, the signal processing unit 112 outputs a data stream such as a transport stream (TS) based on a MPEG-2 TS system or an MMT/TLV stream based on an MMT/TLV system. Data related to contents such as images and sound may be input from the HDMI I/F 100 to the signal processing unit 112, and the signal processing unit 112 may process the input data.

When a data stream output from the signal processing unit 112 is input to a sound processing unit 113, the sound processing unit 113 decodes the sound encoding data of the data stream, and outputs the sound data obtained by the decoding.

For example, a sound output processing unit 114 adjusts the volume, quality, etc., of the sound data input from the sound processing unit 113, modifies the sound data corresponding to a subsequent speaker system 115 as needed, and outputs the sound data.

The speaker system 115 is, for example, a speaker, and converts the sound data input from the sound output processing unit 114 into sound and outputs it.

When a data stream output from the signal processing unit 112 is input to an image processing unit 116, the image processing unit 116 decodes the image encoding data of the data stream and outputs the image data obtained by the decoding.

The display output processing unit 117 adjusts, for example, the image quality, the level and range of brightness and the range of color gamut of the image data input from the image processing unit 116, and outputs the data. The display output processing unit 117 outputs the display information input from the HDMI I/F 100 to the display unit 118. The display information is, the information to display on the display unit 118, for example, the contents of a unique command list. A unique command can be operated when the user operates the remote control 11 while viewing the contents of the unique command list displayed in the display unit 118.

The display unit 118 is, for example, a monitor, converts image data input from the display output processing unit 117 into an image signal and outputs the image signal. When the television device 10 is configured to communicate with a mobile terminal such as a smartphone or a tablet type PC in accordance with, for example, near-field communication or WiFi (registered trademark) communication, the screen of the mobile terminal may be used in place of the display unit 118.

For example, the CPU 119 controls each function and processes data in the television device 10. In the present embodiment, for example, the CPU 119 processes a remote control command transmitted from the remote control 11 and a command generated by a switch or button provided in the main body of the television device 10, and controls the HDMI I/F via CEC control signal line C10 so as to generate and output a CEC command. The CPU 119 obtains data related to a CEC command from the HDMI I/F via CEC control signal line C10.

A RAM 120 and a ROM 121 are a random access memory and a read-only memory, respectively, and are used for the process of each function of the television device 10.

An operation unit 122 is, for example, a user interface such as a switch or button provided in the main body of the television device 10. The operation unit 122 may be a user interface such as a keyboard or mouse for a personal computer as long as it is connectable to the television device 10.

For example, a photoreceiver 123 receives a remote control signal transmitted by the remote control 11.

Internal buses 124 and 125 are data buses connecting the functions of the television device 10. Internal buses 124 and 125 may be separate buses or structured as the single same bus.

FIG. 4 shows an example of the functional configuration of the HDMI I/F 100 of the television device according to the embodiment.

For example, a control unit 1001 controls and manages each function of the HDMI I/F 100. Although connecting lines are not shown for functional blocks, the control unit 1001 is configured to perform control and data transfer for all the functional blocks.

A CEC processing unit 1002 generates a CEC command based on a request from the control unit 1001, the CPU 119, etc., and generates and outputs CEC signal data in accordance with a format corresponding to the HDMI standard. In the present embodiment, the CEC processing unit 1002 generates a command (hereinafter, referred to as a unique CL request command) which requests a unique command list from the device to be controlled and a command (hereinafter, referred to as a state request command) which requests the current device state as CEC commands. Here, the device state includes, for example, an operation state such as a state in which the device is in the middle of recording, playing or writing, and also includes a device state specified by a predetermined state identification code. The CEC processing unit 1002 processes a CEC command (CEC signal data) received from an external control device.

An HDMI transmission unit 1003 is connected to a connector of HDMI cable 30, and outputs CEC signal data output from the CEC processing unit 1002 as a CEC signal to CEC signal line C30.

An HDMI reception unit 1004 is connected to a connector of HDMI cable 30, receives and processes a CEC signal output from an external device on CEC signal line C30, and obtains and outputs CEC signal data. In the television device 10 which is a sink device, the HDMI reception unit 1004 functions as an HDMI input port, receives and processes the data of contents input from data signal line D30 and output from an external source device, such as images and sound, and outputs the data.

A user interface input-output processing unit (hereinafter, referred to as a UI input-output processing unit) 1005 receives, for example, a request by a remote control command from the remote control 11 of the television device 10 or a request from the operation unit 122, etc., via the CPU 119, and processes the request. Based on the received and processed request, the UI input-output unit 1005 controls the CEC processing unit 1002, obtains the information stored in a storage unit 1006, processes the information as needed, generates the display information of one or more unique commands, and outputs it to the display output processing unit 117 and the sound output processing unit 114 of the television device 10.

The storage unit 1006 stores the information of one or more unique commands (including a unique command list) obtained from each device and the information of the device state of each device, etc. The data of the storage unit 1006 can be rewritten.

An update processing unit 1007 updates the data stored in the storage unit 1006.

For example, a basic functional unit 1008 is a basic function in the HDMI standard such as the decoding process of image and sound data obtained from the outside via data signal line D30.

FIG. 5 is a block diagram showing an example of the functional configuration of the HDD recorder 20 according to the embodiment.

An HDMI I/F 200 is connected to HDMI cable 30 in conformity with the HDMI-CEC standard, and exchanges data with an external device in the HDMI system. In particular, the HDMI I/F 200 in the HDD recorder 20 which is a source device transmits data related to contents such as images and sound from data signal line D30 to an external device. The HDMI I/F 200 receives a CEC signal from CEC signal line C30, processes the CEC signal, obtains a CEC command and outputs the information of the obtained CEC command to CEC control signal line C20. When the HDD recorder 20 is a control device, the HDMI I/F 200 generates a CEC command based on a request from a CPU 208, etc., and outputs the CEC command to CEC signal line C30.

An HDD control unit 201 controls the input/output of the data of contents stored in a storage unit (not shown) of the HDD recorder 20. Specifically, for example, when the HDD recorder 20 receives a CEC command indicating a play request for stored contents from the television device 10 via CEC signal line C30, the HDD control unit 201 inputs the data of the stored contents to a signal input processing unit 202 and reproduces the data of the contents.

The signal input processing unit 202 separates the input data of the stored contents into, for example, sound storage data and image storage data, inputs the sound storage data to a sound input processing unit 203 and inputs the image storage data to an image input processing unit 204.

The sound input processing unit 203 and the image input processing unit 204 apply a decoding process to the input data, and output the data to a sound processing unit 205 and an image processing unit 206, respectively.

The sound processing unit 205 and the image processing unit 206 process the input data in accordance with the specification of the device which requested the contents data, and output the data to an HDMI signal processing unit 207.

The HDMI signal processing unit 207 processes the input contents data in accordance with the HDMI standard, and outputs the data to the HDMI I/F 200. The contents data is input to the television device 10 from the HDMI I/F 200 via data signal line D30, and is output as contents from the speaker 115 and the display unit 118 of the television device 10.

For example, the CPU 208 controls each function and processes data in the HDD recorder 20. In the present embodiment, the CPU 208 obtains data related to a CEC command from the HDMI I/F 200 via CEC control signal line C20. When the HDD recorder 20 functions as a control device, the HDMI I/F is controlled to generate and output a CEC command.

A RAM 209 and a ROM 210 are a random access memory and a read-only memory, respectively, and are used for the process of each function of the HDD recorder 20.

An operation unit 211 is, for example, a user interface such as a switch or button provided in the HDD recorder 20. The operation unit 211 may be a keyboard or mouse for a personal computer as long as it is connectable to the HDD recorder 20. For example, stored data may be edited or deleted from a keyboard or mouse for a personal computer via a separate monitor (not shown) connected to the HDD recorder 20.

For example, a photoreceiver 212 receives a remote control command transmitted by an accompanying remote control (not shown) of the HDD recorder 20. For example, the function of the HDD recorder 20 can be operated by a remote control command received by the photoreceiver 212.

Internal buses 213 and 214 are data buses connecting the functions of the HDD recorder 20. Internal buses 213 and 214 may be separate buses or structured as the single same bus.

Figure 6:
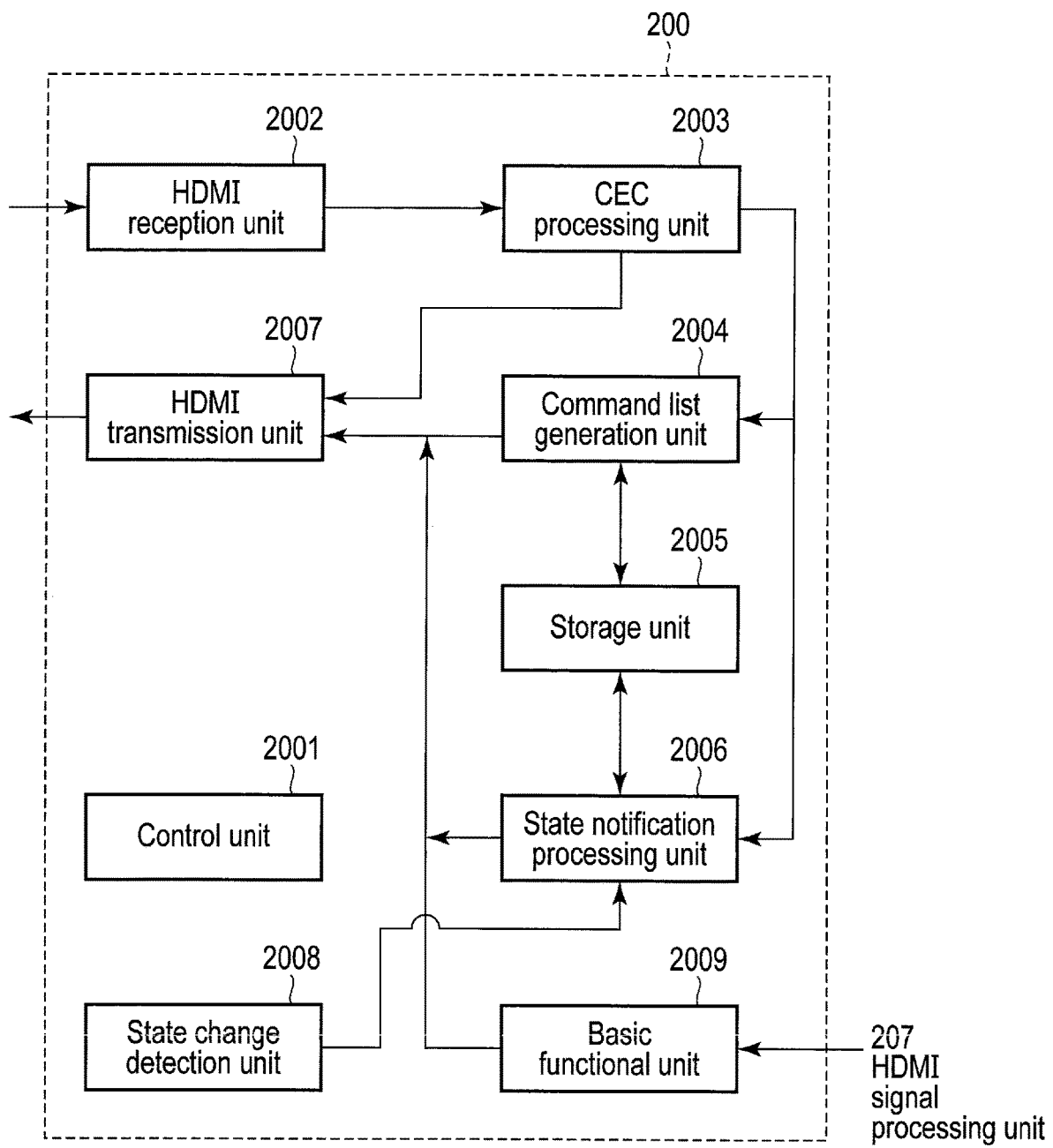
FIG. 6 is a block diagram showing an example of the functional configuration of the HDMI I/F of the HDD recorder according to the embodiment.

FIG. 6 is a block diagram showing an example of the functional configuration of the HDMI I/F 200 of the HDD recorder according to the embodiment.

For example, a control unit 2001 controls each function of the HDMI I/F 200. Although connecting lines are not shown for functional blocks, the control unit 2001 is configured to perform control and data transfer for all the functional blocks.

An HDMI reception unit 2002 is connected to a connector of HDMI cable 30, receives and demodulates a CEC signal output from an external device on CEC signal line C30, and obtains and outputs CEC signal data.

A CEC processing unit 2003 extracts a CEC command from the CEC signal data received from the HDMI reception unit 2002, and controls each function and transmits request information to the control unit 2001 based on the request of the CEC command. When the HDD recorder 20 functions as a control device, the CEC processing unit 2003 generates a CEC command and CEC signal data.

When the CEC processing unit 2003 receives a unique CL request command, a command list generation unit 2004 generates and outputs a unique command list. The unique command list at least includes a unique command identification code set for each unique command. The unique command list may be prepared in consideration of the device state of the HDD recorder 20.

A storage unit 2005 stores the information of one or more unique commands such as a unique command list generated by the command list generation unit 2004, and other information. The data of the storage unit 2005 can be rewritten.

A state notification processing unit 2006 generates state notification data (state transition notification data) for indicating the device state of the HDD recorder 20. The state notification processing unit 2006 also generates state change notification data for indicating that the device state is changed. The generated state notification data and state change notification data may be transmitted when, for example, they are requested by the television device 10. Alternatively, such data may be autonomously generated and broadcasted to another device in the HDMI system when the device state is changed inside the HDD recorder 20. Alternatively, such data may be transmitted to only another specific device. When the television device 10 requests state change notification data from the HDD recorder 20, a command which requests state change notification data is defined and transmitted as a CEC command. The state notification data and state change notification data may include the information of, for example, a state identification code, a display label (character string) for displaying the device state in the destination which received notification data, and an icon.

An HDMI transmission unit 2007 is connected to a connector of HDMI cable 30, functions as an HDMI output port and outputs the data of contents such as images and sound. In the present embodiment, the HDMI transmission unit 2007 transmits unique command information such as a unique command list generated by the command list generation unit 2004, and state notification data (state transition notification data) and state change notification data generated by the state notification processing unit 2006. Data signal line D30 of the HDMI cable is used to output the data of contents in the HDMI transmission unit 2007. However, CEC signal line C30 may be used to transmit unique command information such as a unique command list, state notification data and state change notification data in the present embodiment. Data signal line D30 may be used depending on the case.

A state change detection unit 2008 detects the device state of the HDD recorder 20. When the device state changes, or based on a request from another device, the state change detection unit 2008 outputs the situation of the change in the detected device state and the current device state. The device state includes, for example, the state of operation by a function performed by the HDD recorder 20 by a CEC command output from the television device 10, and the state of operation by a function performed by a request from the operation unit 211 and the photoreceiver 212 of the HDD recorder 20. For example, the device state includes the states of "repeat", "skip play", "rewind play", "high-speed play" and "representative thumbnail image play".

For example, a basic functional unit 2009 is a basic function such as a process for, when the HDD recorder 20 outputs the data of contents such as images and sound to an external device in the HDMI system as a source device, conforming the data of contents input from the HDMI signal processing unit 207 to the HDMI standard.

First Embodiment

In the present embodiment, this specification shows an example in which, when the vendor of a control device is different from that of the device to be controlled in an HDMI system, the control device makes an inquiry to the device to be controlled about a unique command such that the control device is allowed to execute the unique command of the device to be controlled. The control device is a television device 10, and the device to be controlled is an HDD recorder 20.

Figure 7:
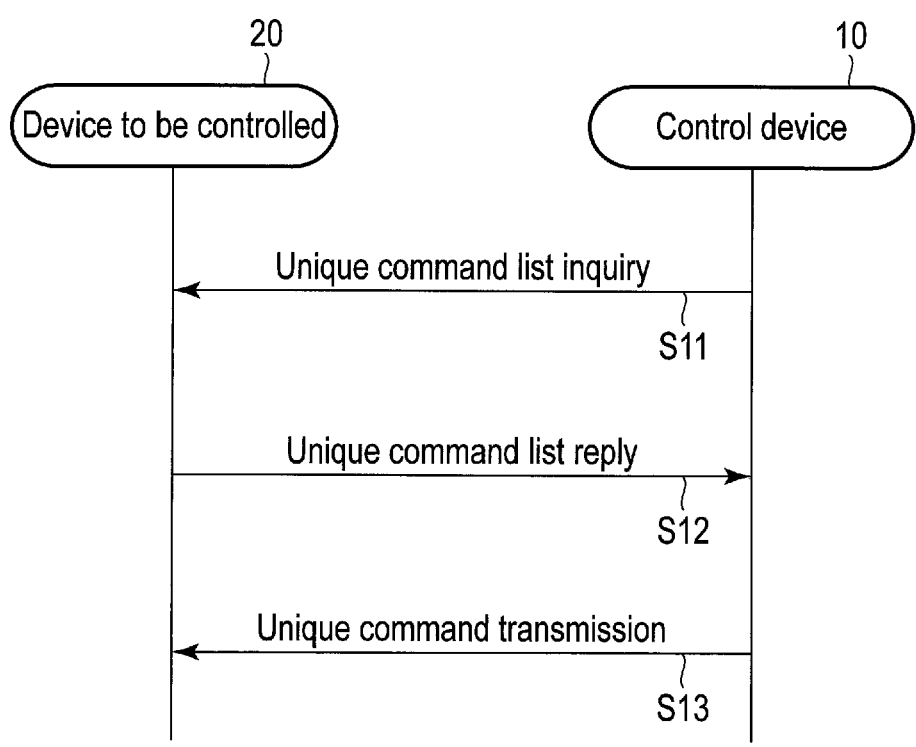
FIG. 7 is a sequence chart in which a control device obtains the information of unique commands from the device to be controlled according to a first embodiment.

FIG. 7 is a sequence chart in which the control device obtains the information of one or more unique commands from the device to be controlled, and the control device transmits a unique command to the device to be controlled according to the first embodiment.

For example, when the television device 10 detects the HDD recorder 20 such as when the HDD recorder 20 is newly connected to the HDMI system or newly turned on, the television device 10 transmits a unique CL request command to the HDD recorder 20 (step S11). The HDD recorder 20 receives and processes the unique CL request command, prepares a unique command list and transmits it to the television device 10 (step S12). For example, the television device 10 notifies a user of one or more transmittable unique commands from a display unit 118, etc., of the television device 10 based on the received unique command list. The user transmits a unique command to the HDD recorder 20 by, for example, operating a remote control 11 (step S13).

FIG. 8 is a flowchart showing a processing operation in which the control device requests the information of a unique command from the device to be controlled according to the first embodiment.

The user executes, for example, a command for "display connected devices" for displaying the devices connected to the HDMI system from the remote control 11 of the television device 10. The command may be executed by pressing a button provided in the remote control 11. Alternatively, an operation screen may be displayed in the display unit 118 of the television device 10, and the user may specify the command on the displayed operation screen from the remote control 11 to execute the command. When a photoreceiver 123 receives a remote control command signal for "display connected devices", a CPU 119 instructs a display output processing unit 117 to display the connected devices, and the display output processing unit 117 causes the display unit 118 to display the connected devices (YES in step S101, and step S102).

Figure 9:
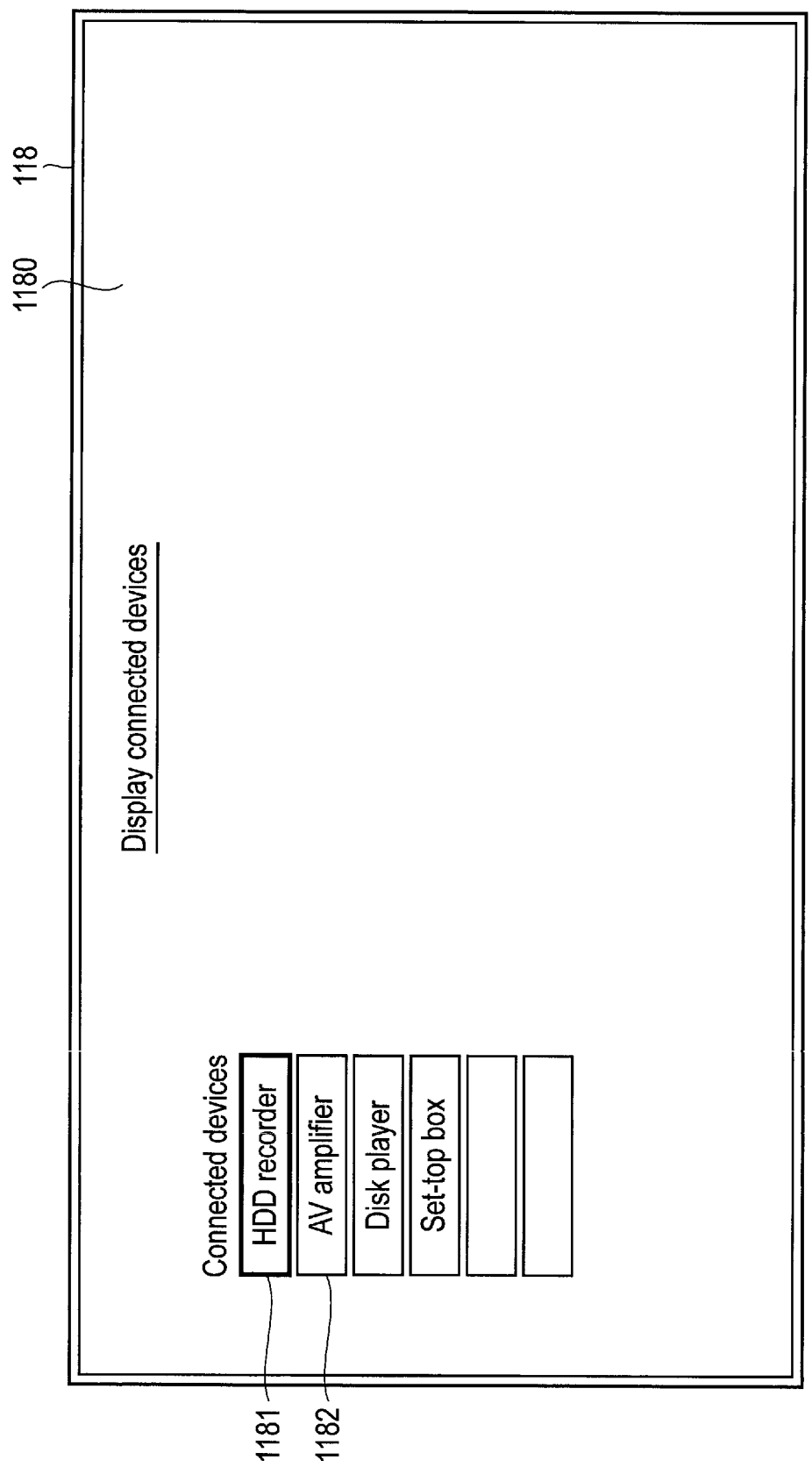
FIG. 9 shows a display example in which the control device displays the devices connected to the HDMI system according to the first embodiment.

FIG. 9 shows a display example in which the control device displays the devices connected to the HDMI system according to the first embodiment.

A display screen 1180 for "display connected devices" is displayed in the display unit 118. The names of the devices connected to the HDMI system are displayed on the display screen 1180. The present embodiment shows an example in which the names of the devices (the HDD recorder 20, a set-top box 21, a disk player 22 and an AV amplifier 23) are displayed. However, for example, marks or symbols may be displayed as long as they can specify the devices. In the example, the portions in which the names of the devices are displayed are buttons. In the example, button 1181 is a button for executing a command for the HDD recorder 20. Button 1182 is a button for executing a command for the AV amplifier 23.

Returning to FIG. 8, when the user presses button 1181 of FIG. 9, a photoreceiver 123 provided in the television device 10 receives a remote control command signal, and the CPU 119 analyzes the remote control command. As a result of analysis, the CPU 119 detects a fact that the user selects the HDD recorder 20 (step S103). The CPU 119 confirms whether or not the HDD recorder 20 is a product of a vendor (another company) different from the vendor of the television device 10 from the information of the HDD recorder 20 (step S104). When the HDD recorder 20 is a product of a vendor different from the vendor of the television device 10, the CPU 119 causes an HDMI I/F 100 to generate a unique CL request command to request a unique command list owned by the HDD recorder 20 from the HDD recorder 20 (YES in step S104, and step S105). More specifically, when a control unit 1001 provided in the HDMI I/F 100 receives an instruction to generate a unique CL request command from the CPU 119, the control unit 1001 causes a CEC processing unit 1002 to generate a unique CL request command. The CPU 119 may directly output a generation instruction to the CEC processing unit 1002 without the intervention of the control unit 1001. The CEC processing unit 1002 which received an instruction to generate a unique CL request command generates a unique CL request command (command inquiry) (step S105).

The CEC processing unit 1002 outputs the generated unique CL request command to an HDMI transmission unit 1003 as CEC signal data in accordance with the HDMI standard. The HDMI transmission unit 1003 outputs the CEC signal data to CEC signal line C30 of HDMI cable 30 (step S106).

When, an HDMI reception unit 1004 receives a reply signal for the unique CL request command from the HDD recorder 20 via HDMI cable 30, the HDMI reception unit 1004 extracts data and outputs the data to the control unit 1001. The control unit 1001 analyzes the data and obtains a unique command list (step S107).

FIG. 10 shows an example of a unique command list obtained by the control device according to the first embodiment. In the example, N unique commands are described in the unique command list.

In field 301, the number N of unique commands described in the unique command list is indicated by the values of 1 byte. In field 302, the identification code (hereinafter, referred to as a unique command identification code) of the first unique command is indicated by the values of 1 byte. In field 303, the number s1 of characters of the first unique command is indicated by the values of 1 byte. In field 304, the character string of the first unique command is indicated by the values of s1 byte(s). In field 304, for example, the character string of the name of a function related to the unique command may be entered.

An identification number indicating an icon, symbol, mark, etc., may be entered in field 304. In this case, the television device 10 needs to know in advance an identification number indicating an icon, symbol, mark, etc.

A single unique command 1 is indicated by three fields 302, 303 and 304. Another unique command n is also indicated by three fields 305. In FIG. 10, for example, the information of three fields 302, 303 and 304 is shown for unique command 1. However, the number of fields may be increased to add information. For example, the information of a unique command such as a plurality of function correspondence data items related to a unique command such as an icon, symbol and mark, the information of the device state of the HDD recorder 20 in which a unique command is valid, and the information of the device state of the HDD recorder 20 in which a unique command is invalid, may be included. In this case, a field indicating the number of fields allocated to each unique command may be set.

Returning to step S107 of FIG. 8, the control unit 1001 also outputs the obtained unique command list to a UI input/output processing unit 1005. The control unit, 1001 may store the obtained unique command list in a storage unit 1006. The user may set whether or not the unique command list should be stored. The UI input/output unit 1005 outputs unique command list data prepared by applying adjustment related to display or or format shaping to the unique command list as needed to the display output processing unit 117. After the display output processing unit 117 applies adjustment related to display to the unique command list data as needed, the display output processing unit 117 outputs unique command list display data to the display unit 118. The display unit 118 displays the input unique command list (step S109). The present embodiment shows an example in which a unique command list is displayed in the display unit 118. However, information related to a unique command list may be output from a speaker 115 by sound.

Figure 11:
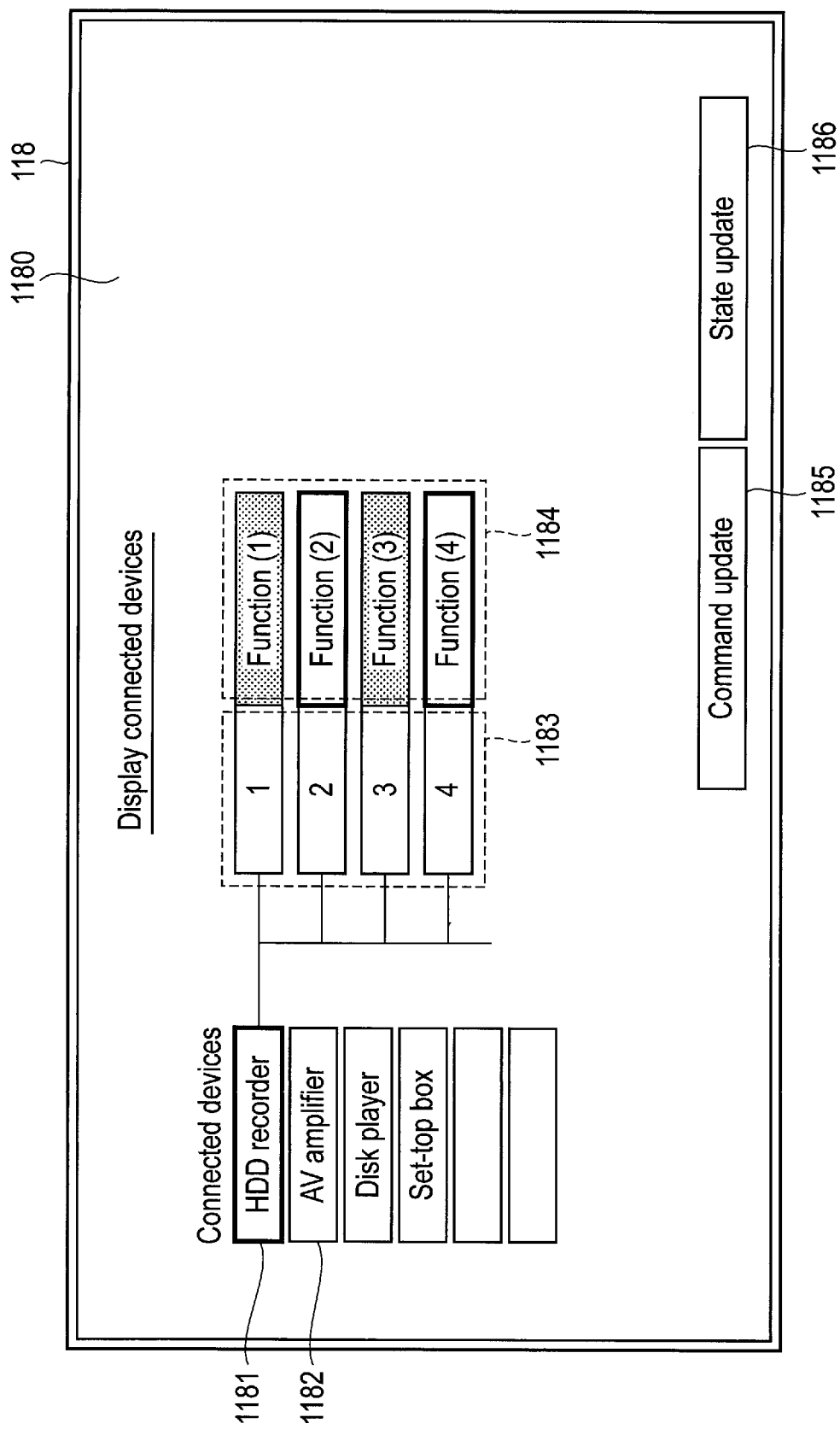
FIG. 11 shows an example in which the control device displays the information of unique commands obtained from the device to be controlled according to the first embodiment.

FIG. 11 shows a display example in which the control device displays the information of unique commands obtained from the device to be controlled according to the first embodiment.

On a display screen 1180 "display connected devices" of the display unit 118, the unique command list of the HDD recorder 20 which is the device selected in step S103 is displayed. Display frame 1183 indicates command numbers. Display frame 1184 indicates functions indicating commands. Each of function (1), function (2), function (3) and function (4) displayed in display frame 1184 indicates a corresponding unique command. Specifically, the functions indicate the unique commands of the HDD recorder 20 to perform the functions "display a recorded program list" and "edit a recorded program list". For example, function (1) corresponds to unique command 1 described in fields 302 to 304 of FIG. 10. Specifically, the character string transmitted in field 304 of FIG. 10 may be inserted into function (1) of display frame 1184. Function correspondence data indicating the contents of the command such as an icon, symbol or mark corresponding to the unique command may be inserted in place of the name of the function by the character string transmitted in field 304 of FIG. 10. A company name may be included. The function correspondence data is the data transmitted by the unique command list shown in FIG. 10.

For example, the contents displayed in display frame 1184 may be selected by the user from the remote control 11. The contents displayed in display frame 1184 may be edited by the user. The present embodiment shows that the commands displayed in display frame 1184 are only unique commands. However, the commands to be displayed are not particularly limited to unique commands. For example, although a common command is mounted in the remote control 11 in many cases, a common command may be displayed in display frame 1184. In the example, only two display frames 1183 and 1184 are shown. However, the number of display frames may be increased to add information necessary for each unique command. For example, the user may not be able to immediately understand a unique command only by the name of the unique command as the name is unique to the vendor. In consideration of this case, a display frame (not shown) may be added to the right side of display frames 1183 and 1184 for each unique command to display function correspondence data such as the explanation of the function or information regarding the validity/invalidity of the function in the added display frame. The function correspondence data is included in the unique command list (FIG. 10) transmitted by the HDD recorder 20 by a unique CL request command transmitted by the television device 10.

For example, display frames 1183 and 1184 may be pressed as buttons, and when a button is pressed, the unique command of the pressed function may be executed. In display frame 1184, function (1) and function (3) are grayed out. For example, a fact that the function of a unique command is invalid may be indicated by grayout in consideration of the device state of the HDD recorder 20. A button may be grayed out such that it cannot be pressed. An invalid command may not be displayed.

When all the commands of the HDD recorder 20 can be executed from the television device 10, such as when the HDD recorder 20 which is selected as the device to be controlled on the display screen 1180 of FIG. 9 is not a product of another company in step S104 of FIG. 8, all the executable commands may be displayed as shown in FIG. 11 (NO in step S104, and steps S108 and S109).

When the television device 10 has obtained a unique command list from the HDD recorder 20 and stored the unique command list, the stored unique command list may be displayed without performing the process of steps S105 to S107 such that unique commands can be executed.

When a command update button 1185 in FIG. 11 is pressed while the television device 10 displays the unique command list of the HDD recorder 20 on the display screen 1180 of FIG. 11, the latest command list may be obtained from the HDD recorder 20 and displayed by the process of steps S105 to S107. In particular, this configuration is effective when the unique command list which was previously obtained is displayed.

FIG. 12 is a flowchart showing a processing operation in which the device to be controlled transmits a unique command list according to the first embodiment.

When an HDMI reception unit 2002 provided in the HDD recorder 20 which is the device to be controlled receives CEC signal data via CEC signal line C30, the HDMI reception unit 2002 outputs the CEC signal data to a CEC processing unit 2003. The CEC processing unit 2003 analyzes the CEC signal data. When the received CEC command is a unique CL request command as a result of analysis, the CEC processing unit 2003 causes a command list generation unit 2004 to prepare a unique command list (YES in step S121). The command list generation unit 2004 generates a unique command list from the information of at least one unique command stored in a storage unit 2005. When a unique command list which was prepared in the past is present, the unique command list may be used (step S122).

The generated unique command list is transmitted via HDMI cable 30 (step S123).

When the control device obtains the unique command list from the device to be controlled in the above procedure, the control device is allowed to execute unique commands for the device to be controlled as CEC commands. When the control device executes a unique command for the device to be controlled, for example, the following process is performed.

After the television device 10 obtains the unique command list of the HDD recorder 20, for example, the user presses button 1181 by the remote control to select the HDD recorder 20 as the device to be controlled. When the unique commands of the HDD recorder 20 are displayed as shown in FIG. 11, and the user selects the unique command to be executed by, for example, pressing the command number of the unique command in display frame 1183 by the remote control 11, the UI input/output processing unit 1005 receives the information of the selected unique command. The UI input/output processing unit 1005 causes the CEC processing unit 1002 to generate the selected unique command as a CEC command. The CEC processing unit 1002 generates the CEC command of the unique command so as to at least include the unique command identification code described in field 302 of FIG. 10. The generated CEC command is output to the HDMI transmission unit 1003 as CEC signal data. The unique command selected by the user is transmitted to the HDD recorder 20 from the HDMI transmission unit 1003 via CEC signal line C30. The HDD recorder 20 which received the unique command performs a process in the CEC processing unit 2003, recognizes the contents of the unique command and performs a process in accordance with the contents of the command in a manner similar to that of the process of a normal CEC command.

Thus, in the present embodiment, the control device is allowed to execute a unique command for the device to be controlled by obtaining a unique command list from the device to be controlled.

Second Embodiment

The present embodiment shows an example in which, when the device state is changed in the device to be controlled, the device to be controlled outputs a state change notification, and the control device updates the information of the unique command list of the device to be controlled owned by the control device based on the current device state of the device to be controlled.

FIG. 13 is a sequence chart in which the device to be controlled generates a state change notification and a state notification according to the second embodiment.

When the device state is changed in an HDD recorder 20 which is the device to be controlled, the HDD recorder 20 prepares a state change notification and transmits the prepared state change notification to a television device 10 (step S21). When the television device 10 receives the state change notification, the television device 10 transmits a state request command which is an inquiry about the current device state to the HDD recorder 20 (step S22). When the HDD recorder 20 receives the state request command, the HDD recorder 20 collects the device state, generates state notification data and transmits a state notification (a reply to the inquiry) to the television device 10 (step S23). In this procedure, the television device 10 is allowed to know the device state of the HDD recorder 20 when the device state is changed in the HDD recorder 20.

FIG. 14 is a flowchart showing a processing operation in which the device to be controlled transmits a notification of the device state to the control device according to the second embodiment.

A state change detection unit 2008 provided in the HDD recorder 20 monitors the change in the device state of each function of the HDD recorder 20 (step S201). For example, when "play" is performed in the HDD recorder 20, and the state change detection unit 2008 detects the change in the device state by "play", the state change detection unit 2008 instructs a state notification processing unit 2006 to generate a state change notification (YES in step S201, and step S202). The state notification processing unit 2006 obtains the device state of the HDD recorder 20 stored in a storage unit 2005 until the instruction to generate a state change notification is received, reflects the content of the change in the device state input from the state change detection unit 2008 on the obtained device state, and stores the result of reflection in the storage unit 2005 as a new current device state. The state notification processing unit 2006 transmits a state change notification indicating that the device state is changed to an HDMI transmission unit 2007. The HDMI transmission unit 2007 transmits the received state change notification to the television device 10 via HDMI cable 30 (step S203). When an inquiry about the device state (state request command) is received from the television device 10, the state notification processing unit 2006 generates a state notification indicating the current device state, and outputs it to the HDMI transmission unit 2007 (YES in step S204, and step S205). When, for example, an inquiry about the device state (state request command) is not received even after a predetermined time in step S204, the process returns to step S201, and the change in the device state is monitored (NO in step S204). The HDMI transmission unit 2007 transmits the state notification generated by the state notification processing unit 2006 to the television device 10 via HDMI cable 30 (step S206).

Figure 15:
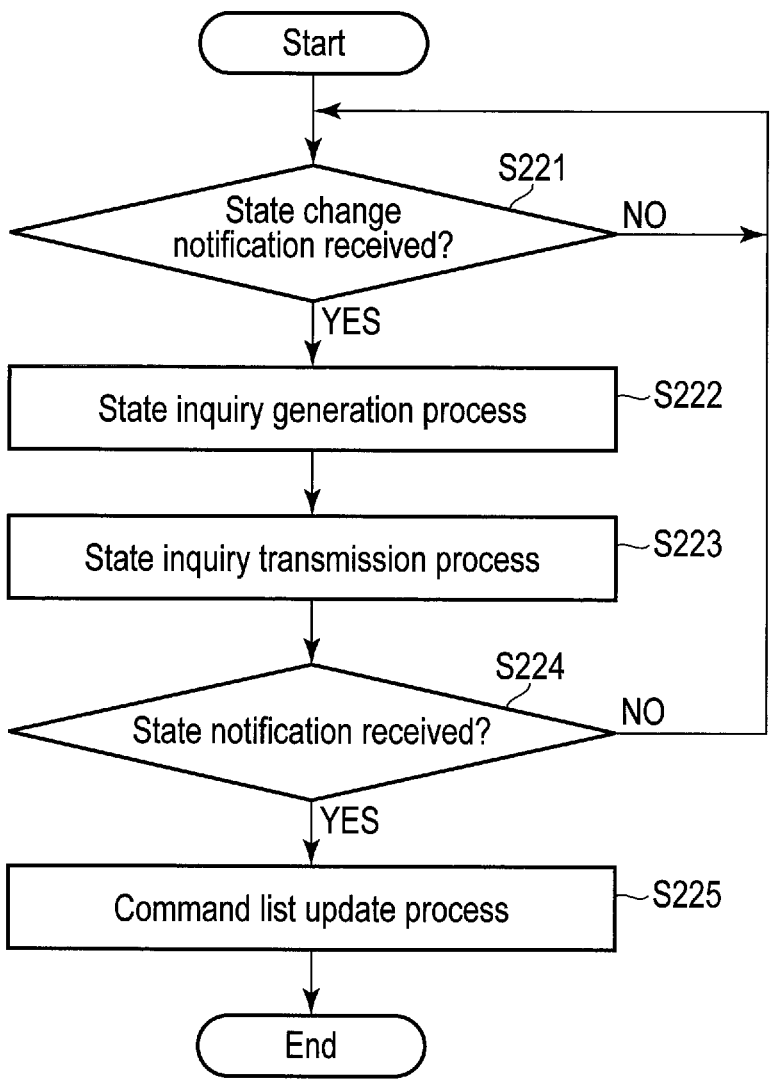
FIG. 15 is a flowchart showing a processing operation for updating a command list when the control device receives a notification of the device state from the device to be controlled according to the second embodiment.

FIG. 15 is a flowchart showing a processing operation for updating a command list when the control device receives a notification of the device state from the device to be controlled according to the second embodiment.

When the television device 10 receives a state change notification from the HDD recorder 20, the television device 10 causes a CEC processing unit 1002 to generate a state request command (YES in step S221, and step S222). The CEC processing unit 1002 generates a state request command (state inquiry) as a CEC command and outputs it to an HDMI transmission unit 1003 as CEC signal data. The HDMI transmission unit 1003 transmits the CEC signal data to the HDD recorder 20 via CEC signal line C30 (step S223). When a state notification is received from the HDD recorder 20, a control unit 1001 causes an update processing unit 1007 to update the unique command list of the HDD recorder 20 stored in a storage unit 1006 (YES in step S224, and step S225). The unique command list in the present embodiment includes the information of validity/invalidity of each unique command by the device state of the HDD recorder 20. For example, in the unique command list generated by the HDD recorder 20 shown in FIG. 10 in the first embodiment, the fields of three types of information of a unique command identification code, the number of characters and a character string are shown. However, in the present embodiment, a field (not shown) indicating the validity/invalidity of each unique command based on the device state of the HDD recorder 20 is added. The validity/invalidity of each command is the possibility of execution of the command. Thus, the update processing unit 1007 determines whether each unique command is valid or invalid based on the state notification from the HDD recorder 20, updates the unique command list based on the result of determination as the information of validity/invalidity of each unique command, and stores it in, for example, the storage unit 1006 (step S225).

As described above, in the control device, the device state of the device to be controlled can be considered for the information of each unique command of the device to be controlled. For example, in a display unit 118 provided in the television device 10 which is the control device, a display frame (not shown) may be added to the right side of display frame 1184 shown in FIG. 11 such that the current validity/invalidity for each unique command is displayed. The information of validity/invalidity obtained in consideration of the device state may be reflected on display frame 1184. For example, an invalid function may be grayed out to invalidate the press of the button such that the function cannot be executed. Alternatively, such a unique command may not be displayed (ON/OFF of display). In other words, the whole row of such a unique command may be eliminated.

A unique command list in view of the latest device state may be displayed by the process of steps S222 to S225 when a state update button 1186 of FIG. 11 is pressed in a state where the television device 10 displays the unique command list of the HDD recorder 20 on a display screen 1180 of FIG. 11.

When, for example, a state notification is not received even after a predetermined time in step S244, the process returns to step S221, and the control unit 1001 continues to monitor the state change notification. In this case, the state may be updated by the above state update button 1186.

As described above, in the present embodiment, the control device obtains the device state of the device to be controlled from the device to be controlled. In this way, the control device is allowed to update the information of the unique command list of the device to be controlled owned by the control device, and appropriately execute a unique command for the device to be controlled.

Third Embodiment

The present embodiment shows an example in which, when the device state is changed in the device to be controlled, the device to be controlled updates the information of one or more unique commands owned by the device to be controlled.

Figure 16:
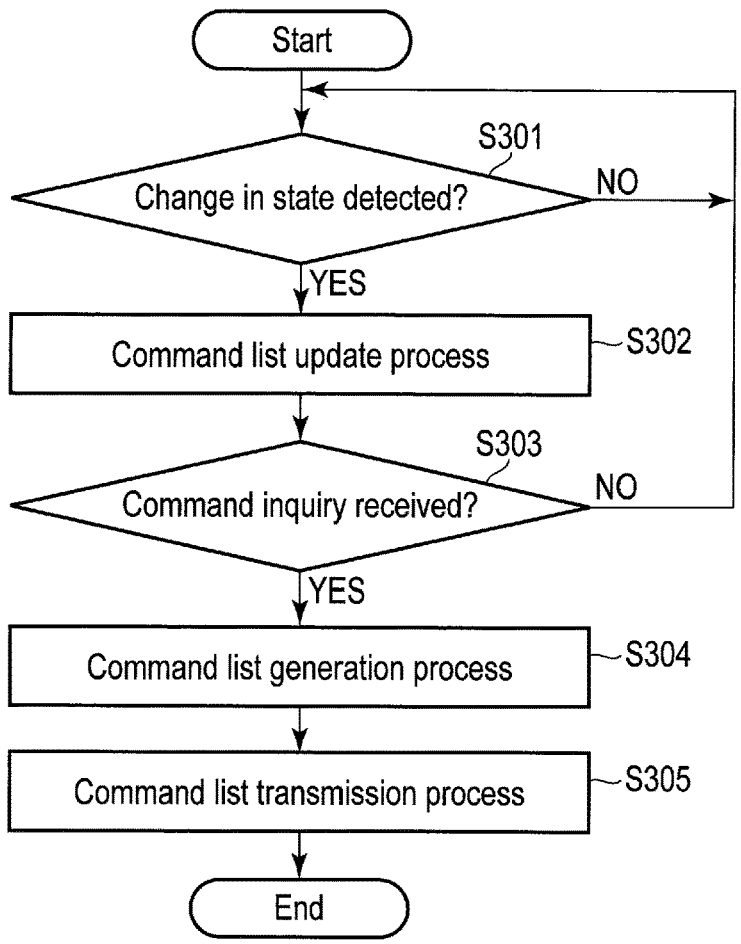
FIG. 16 is a flowchart showing a processing operation for updating a command list when the device to be controlled detects a change in the device state according to a third embodiment.

FIG. 16 is a flowchart showing a processing operation for updating a command list when the device to be controlled detects a change in the device state according to the third embodiment.

A state change detection unit 2008 provided in an HDD recorder 20 which is the device to be controlled monitors the device state of the HDD recorder 20 (step S301). When the state change detection unit 2008 detects a change in the HDD recorder 20, a control unit 2001 causes a command list generation unit 2004 to update (overwrite) the unique command list stored in a storage unit 2005 (step S302). When the information of validity/invalidity (possibility of execution) of each unique command by the device state of the HDD recorder 20 is included in the unique command list stored in the storage unit 2005, the information of validity/invalidity of each unique command is updated. When the information of the device state is associated with each unique command, the information of the device state is updated.

When the receipt of a unique CL request command is confirmed in a CEC processing unit 2003, the command list generation unit generates a unique command list (hereinafter, referred to as a valid unique command list) including only valid unique commands in the unique command list stored in the storage unit 2005 (YES in step S303, and step S304). The valid unique command list is transmitted to the device of the transmission source of the unique CL request command (in the present embodiment, the television device 10) (step S305).

Figure 17:
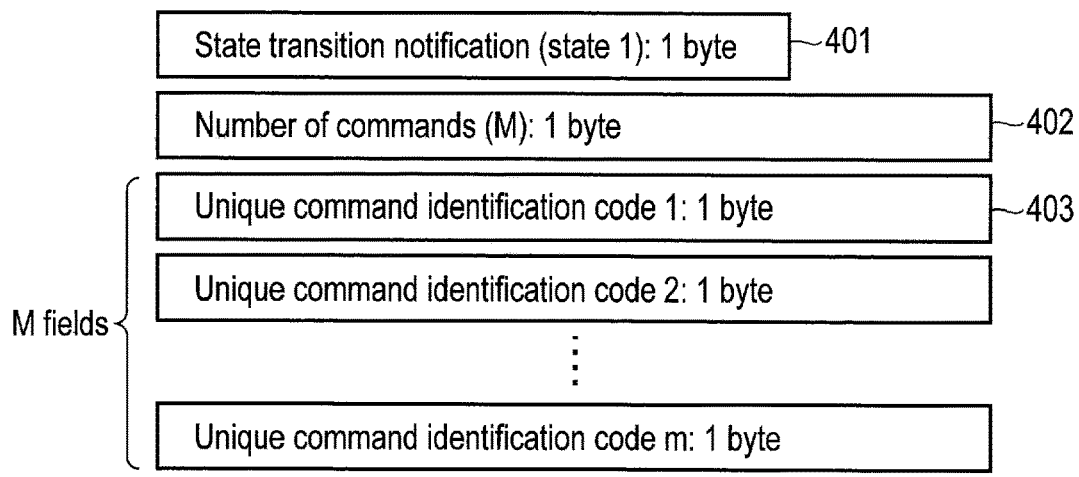
FIG. 17 shows an example of a command list generated by the device to be controlled according to the third embodiment.

FIG. 17 shows an example of a command list generated by the device to be controlled according to the third embodiment, specifically, an example of the valid unique command list generated in step S304.

In field 401, the device state (state transition notification data) of the HDD recorder 20 is indicated by the values of 1 byte. Here, the state transition notification data may be a state identification code determined in the HDMI system in advance. In field 402, the number of unique commands described in the valid unique command list is indicated by the values of 1 byte. In field 403, the unique command identification code of a unique command is indicated by the values of 1 byte. In the example of FIG. 17, the number of fields 403 is M.

When the television device 10 receives the valid unique command list transmitted in step S305 of FIG. 16, an update processing unit 1007 provided in the television device 10 updates the unique command list stored in a storage unit 1006. When the information of validity/invalidity of each unique command by the device state of the HDD recorder 20 is included in the unique command list stored in the storage unit 1006, the update processing unit 1007 updates the validity/invalidity of each unique command in the unique command list stored in the storage unit 1006 based on the information of validity/invalidity of the received valid unique command list. The update processing unit 1007 may directly replace the unique command list stored in the storage unit 1006 by the received valid unique command list. The update processing unit 1007 may update the unique command list stored in the storage unit 1006, using the information of field 401 of the received valid unique command list. In this case, the relationship between state transition notification data and the validity/invalidity of each unique command is obtained in advance.

The user may press command button 1185 on a display screen 1180 of the television device 10 such that the HDD recorder 20 transmits the latest valid unique command list. The content of the received valid unique command list may be displayed on the display screen 1180. Alternatively, the user may change the information of the unique commands displayed on the display screen 1180, using the state transition notification data obtained from the HDD recorder 20 by pressing command button 1186 on the display screen 1180 of the television device 10.

Thus, in the present embodiment, the device to be controlled detects a change in the device state of the device and updates the unique command list of the device from the detected device state. In this way, the device to be controlled is allowed to provide the control device which requests a unique command list with the latest unique command list describing valid unique commands. The control device is allowed to execute a unique command for the device to be controlled by obtaining the unique command list.

Modification Example 1

This modification example 1 shows a modification example of FIG. 11 regarding the display in the display unit 118 of the television device 10 which is a control device.

Figure 18:
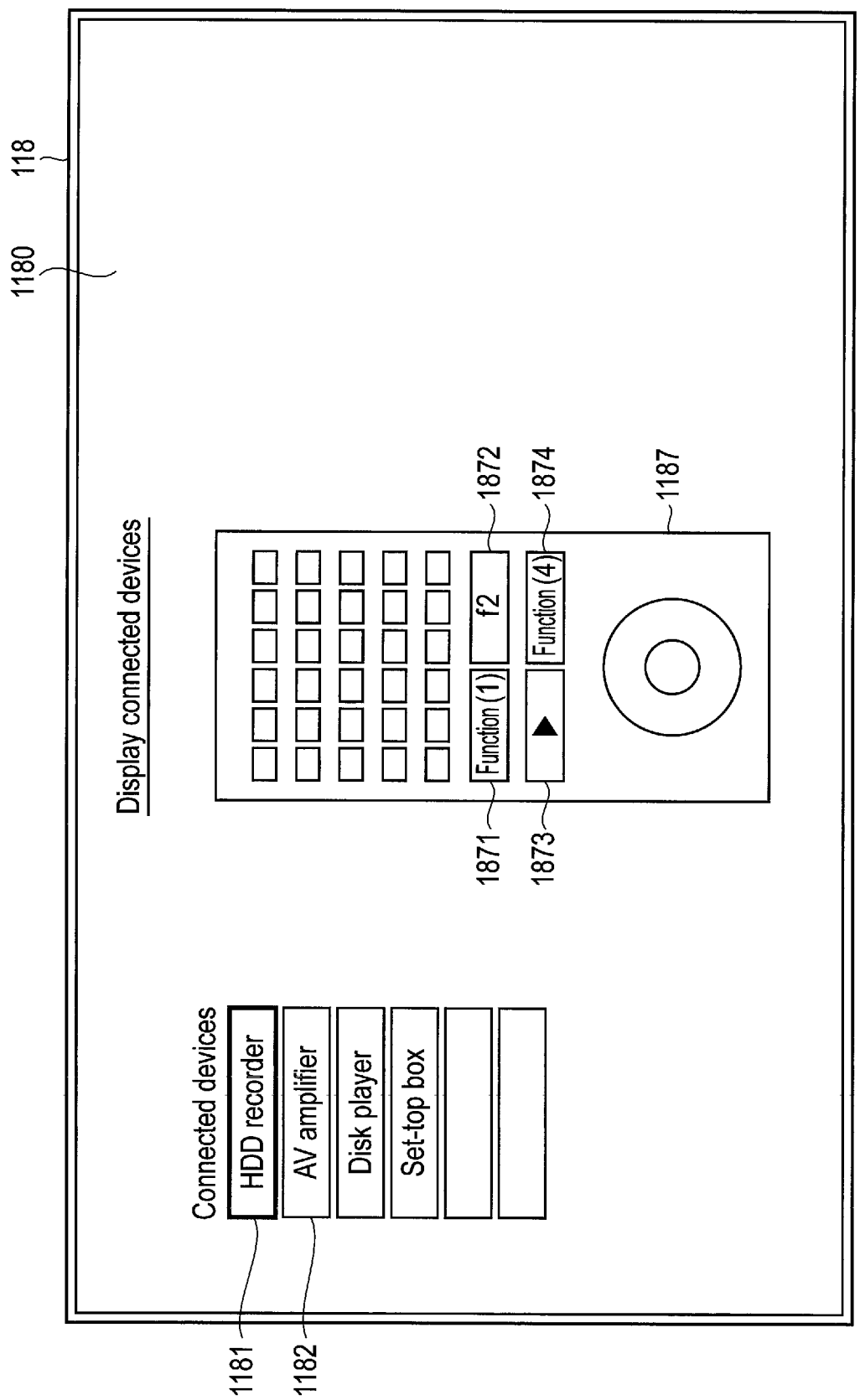
FIG. 18 shows a display example in the display unit of the control device according to modification example 1.

FIG. 18 shows a display example in the display unit of the control device according to modification example 1.

In the example of FIG. 11, the unique commands of the HDD recorder 20 are displayed in display frames 1183 and 1184 when button 1181 is pressed. However, in FIG. 18, when button 1181 is pressed, an image 1187 of the accompanying remote control of the HDD recorder 20 is displayed. On the remote control image 1187, for example, button 1871, button 1872, button 1873 and button 1874 of unique commands are displayed. Buttons 1871 and 1874 are examples in which the names of functions are displayed on buttons. Button 1872 is an example in which f2 is displayed as a symbol for function (2). Button 1873 is an example in which an icon for function (3) is displayed. The user executes a unique command for the HDD recorder 20 by pressing buttons 1871 to 1874 by the remote control 11.

For example, when a unique command is not displayed on the remote control image 1187 as a button, the user may execute the unique command for the HDD recorder 20 on the remote control image 1187 of the display unit 118 while viewing the remote control manual of the HDD recorder 20 by the remote control 11. Information in which the buttons on the remote control image 1187 are associated with the unique commands of the HDD recorder 20 may be included in the unique command list transmitted by the HDD recorder 20 by, for example, adding fields for the unique commands shown in FIG. 10. In this case, the user executes a unique command by, for example, displaying a button indicating the name of the unique command or function correspondence data such as an icon, symbol or mark on the remote control image 1187, and pressing the button.

Modification Example 2

This modification example 2 shows an example in which a test mode for allowing a unique command of the device to be controlled to be tested is applied.

FIG. 19 is a sequence chart in a test mode for allowing a unique command of the device to be controlled to be tested.

The television device 10 and the HDD recorder 20 may comprise a test function. When the user selects a unique command test mode from the menu screen (not shown) of the television device 10, the television device 10 transmits a unique command test mode command to the HDD recorder 20 via the CEC signal line C30. When the HDD recorder 20 receives the unique command test mode command, the HDD recorder 20 transitions to a unique command test mode and transmits an ACK to the television device 10. When the television device 10 receives the ACK, the television device 10 transitions to a unique command test mode (S41). When the television device 10 transitions to a unique command test mode, for example, a message "testing operation function" may be displayed on the screen of the television device 10.

In a unique command test mode, the HDD recorder 20 notifies the television device 10 of the current device state (step S42). The user operates the remote control 11 such that the display screen 1180 of FIG. 11 is displayed in the display unit 118 of the television device 10. In display frame 1184 in a unique command test mode, all the unique commands are valid, and a test operation can be conducted for the HDD recorder 20. When the user presses display frame 1184 and transmits a unique command to the HDD recorder 20 (step S43), the HDD recorder 20 transmits a reply indicating the current device state based on the operation of the unique command to the television device 10 (step S44). For example, regarding a unique command which can be accepted by the HDD recorder 20 based on its device state, a message of an operation based on the unique command, such as "in video recording mode", "in repeat state" or "in skip play state", is transmitted to the television device 10. Regarding a unique command which cannot be accepted by the HDD recorder 20 based on its device state, a message such as "inexecutable in current state" is transmitted to the television device 10. In this way, the user can confirm that the set unique command is appropriately executed in the HDD recorder 20.

Of the above embodiments and modification examples, arbitrary embodiments or arbitrary methods used in the disclosed embodiments may be combined with each other for implementation. In each embodiment, the disclosure may be switched to the method used in the embodiment.

In the above embodiments and modification examples, the television device 10 is a control device, and the HDD recorder 20 is the device to be controlled. However, the control device may be swapped for the device to be controlled. An arbitrary device in the HDMI system may be the control device or the device to be controlled. An arbitrary device in the HDMI system may comprise a unique command. In the above embodiments and modification examples, the control device and the device to be controlled are separate devices. However, a single device (for example, the television device 10) may be a device comprising both the function of the control device and the function of the device to be controlled and used as both the control device and the device to be controlled. In this case, the device used as both the control device and the device to be controlled may be combined with either a device used only as a control device or a device used only as the device to be controlled in the above embodiments to constitute the HDMI system.

As described above, the present embodiment includes the following characteristic structures.

(A-1) A device to be controlled, the device being an HDMI device on which CEC is mounted, the device having a function of indicating information of one or more unique commands in response to an inquiry.

(A-2) The device to be controlled of (A-1), the device having a function of indicating a device state based on a change in its device state, or indicating the device state in response to an inquiry from another device.

(A-3) The device to be controlled of (A-1) or (A-2), wherein a unique command is received as a CEC command.

(A-4) A control device, the device being an HDMI device on which CEC is mounted, the device having a function of inquiring of a device to be controlled information of one or more unique commands.

(A-5) The control device of (A-4), the device having a function of inquiring a device state of the device to be controlled.

(A-6) The control device of (A-4), the device determining validity/invalidity of a transmittable unique command based on the device state of the device to be controlled indicated from the device to be controlled, and adjusting User Interface (UI) display by ON/OFF of command display or grayout based on the validity/invalidity.

(A-7) The control device of (A-4), (A-5) or (A-6), allowed to transmit a unique command to the device to be controlled as a CEC command and execute the unique command by user's operation.

(B-1) A control device comprises a request unit which, when the control device is connected to a device to be controlled defining a unique command, requests a unique command list from the device to be controlled. The control device further comprises a display unit which displays function correspondence data corresponding to the unique command when the unique command list is obtained. The control device further comprises a storage unit which stores the unique command and the function correspondence data based on a specification operation by the user. The control device comprises an operation unit which transmits the unique command to the device to be controlled when the unique command and the function correspondence data corresponding to the unique command are stored in the storage unit, and a specification operation of the unique command is performed by the user in a state where the unique command and the function correspondence data corresponding to the unique command are displayed.

The display unit is allowed to, when the device to be controlled comprises a plurality of unique commands, simultaneously display the unique commands.

The display unit is allowed to, when the device to be controlled comprises a plurality of unique commands, simultaneously display the unique commands and function correspondence data corresponding to the unique commands, and when an arbitrary unique command is specified, display the unique commands such that the specified unique command is distinguished from the unique commands which are not specified. This embodiment also comprises features as a control method of the control device.

(B-2) A device to be controlled defining a unique command comprises a first notification function which transmits, when the device to be controlled is connected to a control device, and receives a request for a unique command list from the control device, the unique command list to the control device. The device to be controlled further comprises a second notification function which causes a function by the unique command to be executed and notifies the control device of an execution state when the unique command is transmitted from the control device. This embodiment also comprises features as a control method of the device to be controlled.

(B-3) In a device control system including a control device and a device to be controlled in the present embodiment, the device to be controlled defines a unique command, and the control device comprises a function of requesting a unique command list from the device to be controlled when the control device is connected to the device to be controlled. The device to be controlled comprises a first notification function of transmitting, when a request for the unique command list is received from the control device, the unique command list to the control device.

The control device comprises a function of displaying the unique command and function correspondence data corresponding to the unique command when the unique command list is obtained, and comprises a storage unit which stores the unique command and the function correspondence data based on a specification operation of the function correspondence data by a user. The control device further comprises an operation unit which transmits the unique command to the device to be controlled when the unique command and the function correspondence data corresponding to the unique command are stored in the storage unit, and a specification operation of the function correspondence data is performed by the user in a state where the unique command and the function correspondence data corresponding to the unique command are displayed.

The device to be controlled comprises a second notification function which causes a function by the unique command to be executed and notifies the control device of an execution state when the unique command is transmitted from the control device. This embodiment also comprises features as a device control method including the control device and the device to be controlled described above.

(C-1) An information device comprising a request command transmission unit which transmits a request command for obtaining information of one or more unique commands which cannot be controlled by a common command in High-Definition Multimedia Interface (registered trademark)-Consumer Electronics Control (HDMI-CEC) via an HDMI cable, and an information reception unit which receives the information of one or more unique commands requested by the request command transmitted by the request command transmission unit from the HDMI cable.

(C-2) The information device of (C-1), wherein the request command transmission unit transmits the request command, using the CEC function.

(C-3) The information device of (C-1) or (C-2), further comprising an inquiry command transmission unit which transmits an inquiry command for inquiring information of a device state via the HDMI cable, wherein the information reception unit receives the information of the device state.

(C-4) The information device of (C-3), wherein the inquiry command transmission unit transmits the inquiry command, using the CEC function.

(C-5) The information device of one of (C-1) to (C-4), further comprising an update processing unit which updates the received information of the unique command by the received information of the device state.

(C-6) The information device of one of (C-1) to (C-5), wherein the information of one or more unique command is processed, and display information to display the information of one or more unique commands is generated and displayed in a display unit.

(C-7) The information device of (C-6), wherein the update processing unit determines validity/invalidity of the unique command included in the received information of the unique command by the received information of the device state, and updates the display information of the unique command displayed in the display unit by the validity/invalidity of the unique command determined by the update processing unit.

(C-8) The information device of (C-7), wherein, when the unique command is valid, the display information of the unique command is displayed in the display unit, and when the unique command is invalid, the display information of the unique command is not displayed.

(C-9) The information device of (C-7), wherein the display unit grays out the display information of the unique command to prohibit execution of the unique command when the unique command is invalid.

(C-10) The information device of one of (C-1) to (C-9), further comprising a CEC unique command transmission unit which generates a CEC command of the unique command from the information of the unique command received in the information reception unit, and transmits the CEC command of the unique command.

(C-11) The information device of (C-10), wherein the CEC command of the unique command at least includes a unique command identification number.

(C-12) A device control method comprising transmitting a request command for obtaining information of a unique command which cannot be controlled by a common command in High-Definition Multimedia Interface (registered trademark)-Consumer Electronics Control (HDMI-CEC) via an HDMI cable, and receiving the information of the unique command requested by the request command transmitted by the request command transmission unit from the HDMI cable.

(C-13) An information device comprising a request command reception unit which receives a request command for requesting information of a unique command which cannot be controlled by a common command in High-Definition Multimedia Interface (registered trademark)-Consumer Electronics Control (HDMI-CEC) from an HDMI cable, a unique command information generation unit which generates the information of the unique command requested by the request command, and an information transmission unit which transmits the information of the unique command generated by the unique command information generation unit via the HDMI cable.

(C-14) The information device of (C-13), wherein at least a unique command identification number is included in the information of the unique command generated by the unique command information generation unit.

(C-15) The information device of (C-13) or (C-14), wherein the request command reception unit receives the request command as a CEC command and executes the request of the request command.

(C-16) The information device of one of (C-13) to (C-15), further comprising an inquiry command reception unit which receives an inquiry command for inquiring information of a device state via the HDMI cable, a state detection unit which detects the device state inquired by the inquiry command, and a state information generation unit which generates the information of the device state based on the device state detected by the state detection unit, wherein the information transmission unit transmits the information of the device state via the HDMI cable.

(C-17) The information device of (C-16), wherein the inquiry command reception unit receives the inquiry command as a CEC command.

(C-18) The information device of (C-16) or (C-17), further comprising a state change notification transmission unit which transmits a state change notification indicating that a change in the device state is detected via the HDMI cable when the state change detection unit detects the change in the device state.

(C-19) The information device of one of (C-13) to (C-18), wherein the unique command described in the information of the unique command is received as a CEC command, and the received unique command is executed.

(C-20) A device control method comprising receiving a request command requesting information of a unique command which cannot be controlled by a common command in High-Definition Multimedia Interface (registered trademark)-Consumer Electronics Control (HDMI-CEC) from an HDMI cable, generating the information of the unique command requested by the request command, and transmitting the generated information of the unique command via the HDMI cable.

(C-21) An information device comprising an inquiry command reception unit which receives an inquiry command for inquiring information of a device state via an HDMI cable, a state detection unit which detects the device state inquired by the inquiry command, and a state information generation unit which generates the information of the device state based on the device state detected by the state detection unit, wherein an information transmission unit transmits the information of the device state via the HDMI cable.

(C-22) An information device comprising an inquiry command reception unit which receives an inquiry command for inquiring information of a device state via an HDMI cable, a state detection unit which detects the device state inquired by the inquiry command, and a state information generation unit which generates the information of the device state based on the device state detected by the state detection unit, wherein an information transmission unit transmits the information of the device state via the HDMI cable.

(C-23) An information device comprising a state change notification transmission unit which transmits a state change notification indicating that a change in a device state is detected via an HDMI cable when a state change detection unit detects the change in the device state.

(C-24) A device control system at least including a first information device and a second information device in conformity with High-Definition Multimedia Interface (registered trademark)-Consumer Electronics Control (HDMI-CEC), wherein the first information device comprises a request command transmission unit which transmits a request command for requesting information of one or more unique commands of the second information device which cannot be controlled by a common command in the HDMI-CEC to the second information device via an HDMI cable, and an information reception unit which receives the information of the unique command requested by the request command transmitted by the request command transmission unit from the second information device via the HDMI cable, and the second information device comprises a request command reception unit which receives the request command transmitted by the first information device from the HDMI cable, a unique command information generation unit which generates the information of the unique command requested by the request command, and an information transmission unit which transmits the information of the unique command generated by the unique command information generation unit to the first information device via the HDMI cable.

(C-25) A device control program for obtaining one or more unique commands which cannot be controlled by a common command in HDMI-CEC, the program causing a computer to transmit a request command for requesting information of the unique command via an HDMI cable, and receive the information of the unique command requested by the request command from the HDMI cable.

(C-26) A device control program for transmitting information of one or more unique commands requested by a request command, the program causing a computer to receive the request command from an HDMI cable, generate the information of one or more unique commands requested by the request command, and transmit the information of the unique command via the HDMI cable.

(D-1) A device control method comprising:
receiving a request command which is a request from an external device for information of one or more unique commands inexecutable from the external device;
generating the information of one or more unique commands requested by the request command; and
transmitting the information of one or more unique commands to the external device.

(D-2) A device control system at least including a first information device and a second information device, wherein
the first information device comprises:
a request command transmission unit which transmits, to the second information device, a request command for obtaining information of one or more unique commands executable only by the second information device from the second information device; and
an information reception unit which receives the information of one or more unique commands requested by the request command from the second information device, and
the second information device comprises:
a request command reception unit which receives the request command transmitted by the first information device;
a unique command information generation unit which generates the information of one or more unique commands requested by the request command; and
an information transmission unit which transmits the information of one or more unique commands to the first information device.

(D-3) A device control program for obtaining information of one or more unique commands executable only by an external device, the program causing a computer to:
transmit a request command for requesting information of one or more unique commands to the external device; and
receive the information of one or more unique commands requested by the request command from the external device.

(D-4) A device control program for transmitting information of one or more unique commands requested from an external device by a request command, the program causing a computer to:
receive the request command from the external device;
generate the information of one or more unique commands requested by the request command; and
transmit the information of one or more unique commands to the external device.

According to at least one of the above embodiments, it is possible to provide an information device, a device control method, a device control system and a device control program such that, in an HDMI system in which a plurality of devices in conformity with the HDMI-CEC standard are connected to each other, each device is allowed to obtain the information of one or more unique commands of another device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Furthermore, the constituent elements in claims are in the scope of the embodiments even if the elements are expressed separately, or the elements are expressed in association with each other, or the elements are expressed in combination with each other. A plurality of embodiments may be combined with each other. Examples structured by these combinations are within the scope of the embodiments.

Even when a claim is expressed as a control logic, or as a program including an instruction for executing a computer, or as a computer-readable recording medium describing the instruction, the device of the embodiments is applied. The embodiments are not limited to the names or terms used in this specification. Even when other expressions are used, as long as they substantially means the same matters, they are included in the scope of the embodiments.

What is claimed is:

1. An information device comprising:
    a request command transmission unit which transmits, to an external device, a request command for obtaining a list of one or more unique commands executable only by the external device from the external device;
    an information reception unit which receives the list of one or more unique commands requested by the request command from the external device and generates display information to display the list of one or more unique commands in a display unit, wherein the display information is at least one of a name of a function, an explanation of the function and an icon or symbol for the function allowing a user to understand content of the one or more unique commands, and
    the display information of each unique command in the display unit is a user interface to execute the each unique command; and
    an inquiry command transmission unit which transmits an inquiry command for inquiring information of a device state,
    the information reception unit receiving the information of the device state, wherein
    validity/invalidity of the unique command included in the received list of one or more unique commands is determined based on the received information of the external device state, and
    the display information displayed in the display unit is adjusted based on the determined validity/invalidity of the one or more unique commands.

2. The information device of claim 1, further comprising an execution command transmission unit which generates an execution command to be executed in the external device from the list of one or more unique commands received in the information reception unit, and transmits the execution command of the unique command.

3. A device control method comprising:
    transmitting a request command for obtaining a list of one or more unique commands executable only by an external device from the external device;
    receiving the list of one or more unique commands requested by the request command from the external device;
    generating display information to display the list of one or more unique commands in a display unit, wherein
    the display information including at least one of a name of a function, an explanation of the function and an icon or symbol for the function allowing a user to understand content of the one or more unique command, and
    the display information of each unique command in the display unit is a user interface to execute the each unique command; and
    transmitting an inquiry command for inquiring information of a device state,
    receiving the information of the device state, wherein
    validity/invalidity of the unique command included in the received list of one or more unique commands is determined based on the received information of the external device state, and
    the display information displayed in the display unit is adjusted based on the determined validity/invalidity of the one or more unique commands.

* * * * *